United States Patent
Seyedmehdi et al.

(10) Patent No.: US 9,301,308 B2
(45) Date of Patent: Mar. 29, 2016

(54) DETERMINING A CLUSTER SET OF MOBILE DEVICES

(71) Applicant: Telefonaktiebolaget L M Ericsson (publ), Stockholm (SE)

(72) Inventors: Seyed Hossein Seyedmehdi, Toronto (CA); Gary D. Boudreau, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 145 days.

(21) Appl. No.: 13/759,419

(22) Filed: Feb. 5, 2013

(65) Prior Publication Data

US 2014/0177461 A1 Jun. 26, 2014

Related U.S. Application Data

(63) Continuation-in-part of application No. 13/723,841, filed on Dec. 21, 2012.

(51) Int. Cl.
*H04L 12/26* (2006.01)
*H04W 72/08* (2009.01)
*H04B 7/02* (2006.01)
*H04W 88/04* (2009.01)

(52) U.S. Cl.
CPC ............ *H04W 72/082* (2013.01); *H04B 7/026* (2013.01); *H04W 72/08* (2013.01); *H04W 72/085* (2013.01); *H04W 88/04* (2013.01)

(58) Field of Classification Search
USPC ......... 370/252, 253, 254, 328, 329, 331, 338, 370/341, 349, 236, 401
See application file for complete search history.

(56) References Cited

U.S. PATENT DOCUMENTS

2005/0041618 A1* 2/2005 Wei et al. ................. 370/328
2006/0153216 A1* 7/2006 Hosein et al. ............. 370/412

OTHER PUBLICATIONS

Author Unknown, "Long Term Evolution Protocol Overview," White Paper—Freescale Semiconductor, Inc., Oct. 2008, 22 pages.
Author Unknown, "LTE Resource Guide," Anritsu Company, 3rd Generation Partnership Project (3GPP), Copyright: 2009, 18 pages.
Becker, Randall, "Precoding and Spatially Multiplexed MIMO in 3GPP Long-Term Evolution," Oct. 2009 High Frequency Electronics, Copyright 2009, pp. 18-26.
Holfeld, Jörg et al., "A Comp Downlink Transmission System Verified by Cellular Field Trials," 19th European Signal Processing Conference (EUSIPO 2011), Aug. 29-Sep. 2, 2011, 5 pages, Barcelona, Spain.

(Continued)

*Primary Examiner* — Chi H Pham
*Assistant Examiner* — Alexander O Boakye
(74) *Attorney, Agent, or Firm* — Withrow & Terranova, PLLC

(57) ABSTRACT

Mechanisms for determining a cluster set of mobile devices are disclosed. A controller node identifies a primary mobile device that has a scheduled transmission for the controller node at a first time. The controller node identifies, from a plurality of mobile devices, a set of eligible assistant (EA) mobile devices. Each EA mobile device in the set is directed to determine a corresponding mobile device-to-mobile device (MD-MD) channel indicator that identifies a quality of a channel between the each EA mobile device and the primary mobile device. The controller node receives from at least one EA mobile device in the set the corresponding MD-MD channel indicator. The controller node then determines a cluster set that includes the primary mobile device and the at least one EA mobile device.

39 Claims, 16 Drawing Sheets

(56) References Cited

OTHER PUBLICATIONS

Written Opinion for International Patent Application No. PCT/IB2014/058788, mailed Jan. 28, 2015, 8 pages.

International Preliminary Report on Patentability for International Patent Application No. PCT/IB2014/058788, mailed May 18, 2015, 11 pages.

U.S. Appl. No. 13/723,841, filed Dec. 21, 2012.

* cited by examiner

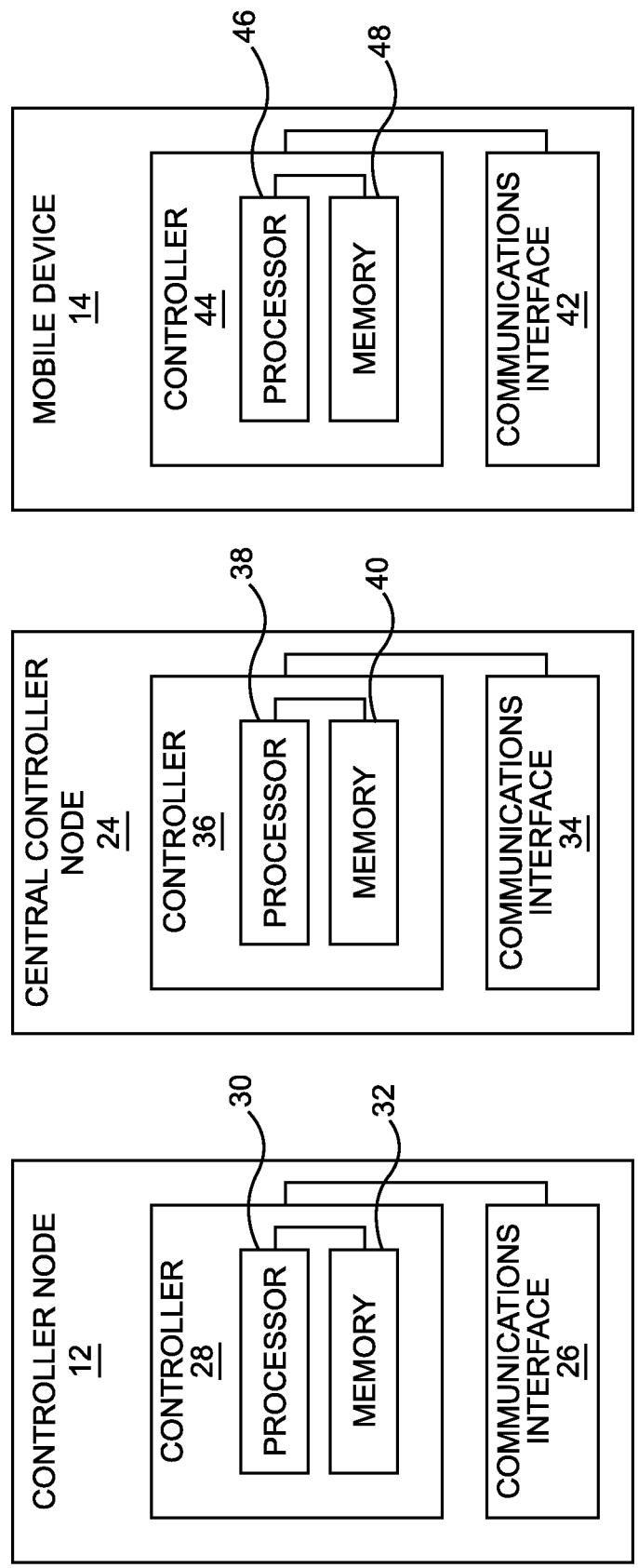

DETERMINING A CLUSTER SET OF MOBILE DEVICES

RELATED APPLICATIONS

This application is a Continuation-in-Part of U.S. application Ser. No. 13/723,841 entitled MOBILE DEVICE ASSISTED COORDINATED MULTIPOINT TRANSMISSION AND RECEPTION, filed Dec. 21, 2012, the disclosure of which is hereby incorporated herein by reference in its entirety.

TECHNICAL FIELD

The present embodiments relate generally to wireless communications, and in particular to the determination of a virtual multiple input multiple output (MIMO) cluster set of mobile devices.

BACKGROUND

Spatial diversity in wireless communications involves the communication of the same data using multiple data paths. The quality of the wireless link, or channel, associated with each data path may differ because each channel may experience a different interference environment. Multiple transmissions of the same data may be combined at the receiver to improve signal reception.

Certain types of wireless environments, such as Wi-Fi and cellular mobile device communications, typically involve one or more relatively fixed-location controller nodes, such as Wi-Fi access points, or cellular base stations, respectively, and multiple mobile devices that are serviced concurrently by the controller node. Some mobile devices, at least for a period of time, may be within wireless range of other mobile devices that are being serviced by the same controller node, and thus, if such mobile devices were suitably coordinated during such period of time, may be able to receive messages from another mobile device and re-transmit the messages to the controller node, thereby implementing spatial diversity for the message transmission and increasing a likelihood of successful wireless data communication with the controller node.

However, multiple factors may affect whether or not any particular mobile device's participation in such coordinated efforts would be desirable, including, for example, the quality of the channel between the coordinating mobile device and the message-originating mobile device, the quality of the channel between the coordinating mobile device and the controller node, the availability or idle state of the coordinating mobile device at or substantially near the transmission time of the message-originating mobile device, whether or not retransmissions by the coordinating mobile device increase interference with a neighboring controller node, and the like. A controller node may be unaware of one or more these factors. Moreover, even if these factors were known to a controller node, the mobile devices that would be useful in implementing spatial diversity would require knowledge of their role. Accordingly, there is a need for mechanisms by which a controller node can acquire information suitable for identifying a cluster set of mobile devices for implementing spatial diversity, as well as mechanisms for coordinating actions by such mobile devices.

SUMMARY

The present embodiments relate to the determination of a cluster set of mobile devices that is suitable for implementing spatial diversity among groups of mobile devices. In particular, a controller node, such as a Wi-Fi access point or a cellular base station, identifies a primary mobile device that has a scheduled transmission for the controller node at a first time. The controller node identifies a set of eligible assistant (EA) mobile devices from a plurality of mobile devices. The controller node directs each EA mobile device in the set to determine a corresponding mobile device-to-mobile device (MD-MD) channel indicator that identifies a quality of a channel between the respective EA mobile device and the primary mobile device. The controller node receives from at least one EA mobile device in the set the corresponding MD-MD channel indicator. The controller node then determines a cluster set that includes the primary mobile device and at least one of the EA mobile devices. The controller node directs each EA mobile device in the cluster set to receive the scheduled transmission and to retransmit the scheduled transmission to the controller node.

In one embodiment, the controller node may identify the EA mobile devices based on a determination that each EA mobile device in the set of EA mobile devices is unscheduled for transmission at the first time.

In another embodiment, mobile devices may determine whether they are eligible to assist the primary mobile device, and if so, send to the controller node an eligibility indicator that indicates the mobile device is eligible to assist the primary mobile device. The controller node identifies the set of EA mobile devices based on the receipt of the eligibility indicators from the mobile devices.

In one embodiment, the controller node may determine the cluster set based on the received MD-MD channel indicators. In another embodiment, the controller node may determine, for each EA mobile device from which a MD-MD channel indicator was received, corresponding mobile device-to-controller node (MD-CN) channel indicators that identify a quality of a channel between each such EA mobile device and the controller node. The controller node may determine the cluster set based on the MD-CN channel indicators. In another embodiment, the controller node may determine the cluster set based on both the MD-MD channel indicators and the MD-CN channel indicators.

The controller node may also receive interference information from one or more neighboring controller nodes that identifies an interference level associated with one or more of the EA mobile devices. The controller node may determine the cluster set based at least in part on such interference information.

In another embodiment, multiple controller nodes may send cluster determination information regarding primary mobile devices and EA mobile devices to a central controller node for cluster set determination based on a system performance metric. In such embodiments, the central controller node receives, from each controller node, cluster determination information that identifies at least one primary mobile device that has a scheduled transmission for the respective controller node at a scheduled time, and at least one eligible assistant (EA) node that is unscheduled for transmission at the scheduled time. The cluster determination information may also include corresponding MD-CN channel indicators, MD-CN channel indicators that indicate a quality of a channel between the respective EA mobile device and the respective controller node, or interference information from one or more neighboring controller nodes that identifies an interference level associated with one or more of the EA mobile devices. The central controller node determines a system performance metric and forms cluster sets based on the system performance metric. The central controller node sends cluster information that identifies the cluster sets to the controller nodes. The system performance metric may comprise any desirable metric, such as, for example, a harmonic mean of the identified primary mobile devices, or an average throughput of the primary mobile devices.

In another embodiment, an EA mobile device receives, from the controller node, a request to determine a MD-MD channel indicator that identifies a quality of a channel between the EA mobile device and a primary mobile device. In response to the request, the EA mobile device listens to a transmission from the primary mobile device. For example, the EA mobile device may listen to a reference signal transmitted by the primary mobile device. The EA mobile device determines a MD-MD channel indicator based on the transmission and sends the MD-MD channel indicator to the controller node. In one embodiment, the EA mobile device may send the MD-MD channel indicator to the controller node only if the MD-MD channel indicator complies with a threshold channel indicator.

If the EA mobile device is selected by the controller node to be part of a cluster set for the primary mobile device, the EA mobile device receives, from the controller node, a request to retransmit a scheduled transmission from the primary mobile device to the controller node. The EA mobile device receives the scheduled transmission from the primary mobile device, and transmits the scheduled transmission to the controller node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 14 is a block diagram illustrating a controller node according to one embodiment;

FIG. 15 is a block diagram illustrating a central controller node according to one embodiment; and FIG. 16 is a block diagram illustrating a mobile device according to one embodiment.

DETAILED DESCRIPTION

Figure 1:
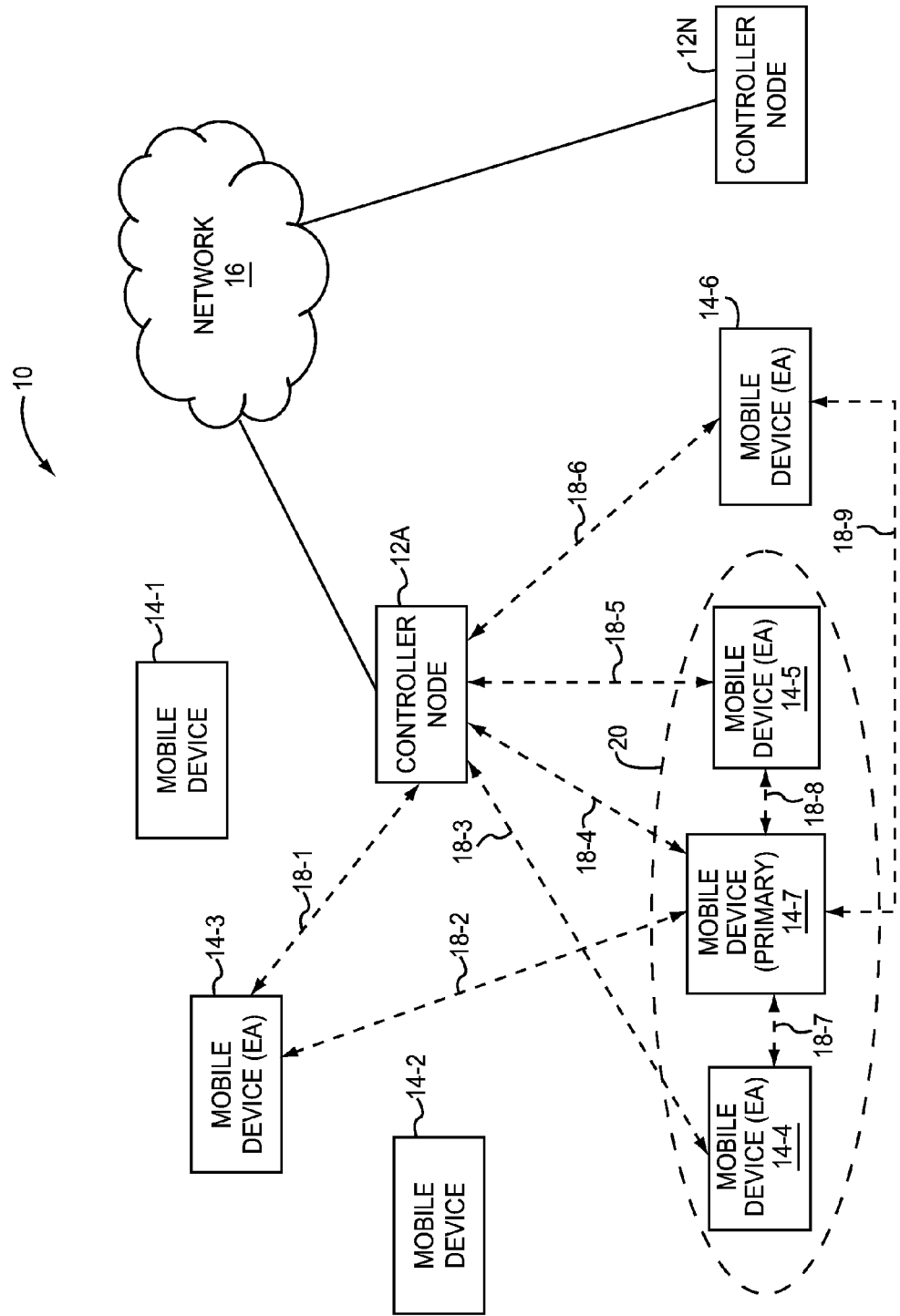
FIG. 1 is a block diagram of a system in which embodiments may be practiced.

FIG. 1 is a block diagram of a system 10 in which embodiments may be practiced. The system 10 includes one or more controller nodes 12A, 12N (generally, controller nodes 12), each of which comprises a wireless coverage area within which the respective controller node 12 may provide service to one or more mobile devices 14-1-14-N (generally, mobile devices 14). Although for purposes of clarity only the controller node 12A is illustrated as servicing associated mobile devices 14, in practice the controller node 12N may also be concurrently servicing other mobile devices 14. Also, while only two controller nodes 12 are illustrated, the system 10 may comprise any number of controller nodes 12.

The system 10 may comprise any suitable wireless communication technology, including for example, a 3G or 4G cellular technology, such as long term evolution (LTE) or LTE advanced technology, or a local area network (LAN) technology, such as any of the Institute of Electrical and Electronics Engineers (IEEE) 802 wireless standards (e.g., Wi-Fi®). In the context of an LTE system 10, the controller nodes 12 may comprise, for example, Evolved Universal Terrestrial Radio Access Network (E-UTRAN) Node B (eNodeB) controllers. In the context of a Wi-Fi® system 10, the controller nodes 12 may comprise, for example, wireless access point (WAP) controllers. It will be appreciated that these are merely examples, and the system 10 may comprise any wireless technology suitable for implementing the functionality described herein.

Each mobile device 14 may comprise any device capable of wireless communications, including, for example, a smart phone; a portable computer such as a laptop or notebook computer; a computer tablet; a personal digital assistant (PDA), or the like. The controller nodes 12 may be communicatively coupled to one another via a wireless channel, via a network 16, or both, and thus may exchange information with one another as appropriate.

The present embodiments relate to the determination of a cluster set of mobile devices 14 for the purpose of implementing spatial diversity, and increasing signal strength of communications from one or more mobile devices 14 to the controller node 12A. While embodiments will be disclosed herein in the context of uplink transmissions from mobile devices 14 to a controller node 12, it will be appreciated that the embodiments have applicability in downlink transmissions as well.

Figure 2:
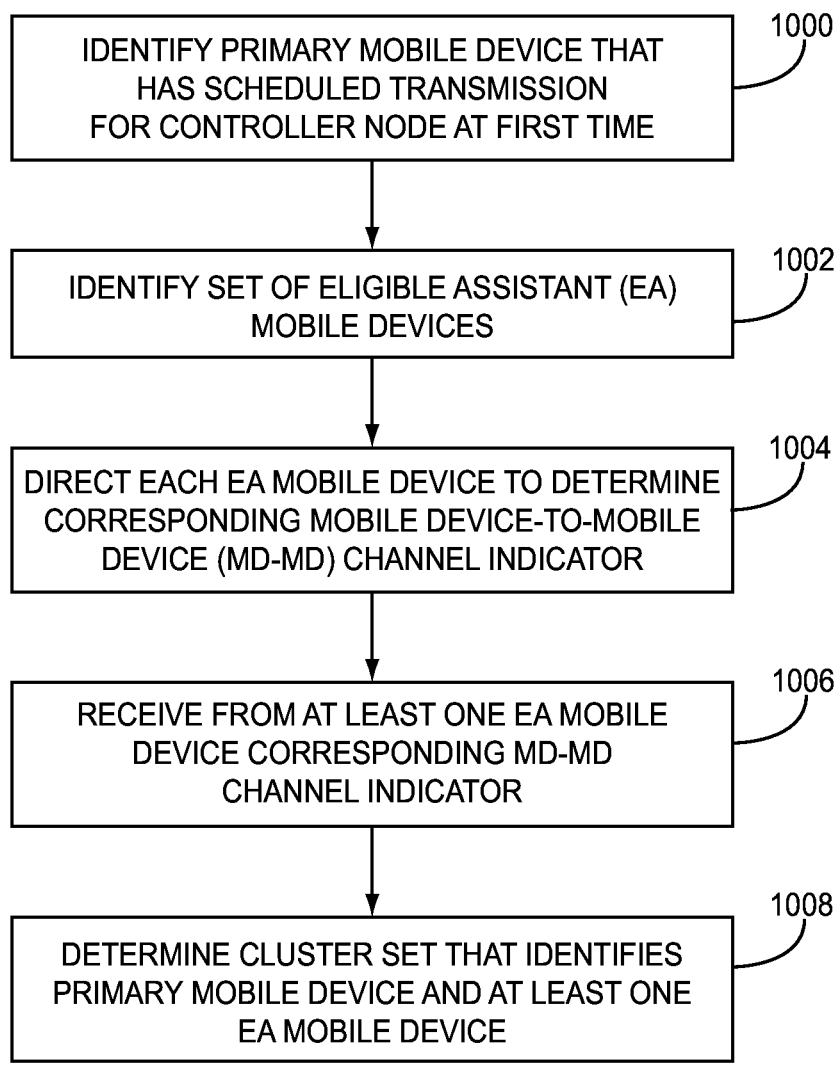
FIG. 2 is a flowchart of a process for determining a cluster set according to one embodiment.

FIG. 2 is a flowchart of a process for determining a cluster set according to one embodiment, and will be discussed in conjunction with FIG. 1. For purposes of illustration, the mobile devices 14 will be referred to hereinafter based on the role a respective mobile device 14 has in the context of the illustrated embodiments. Thus, the mobile device 14-7 will be referred to hereinafter as the primary mobile device 14-7 because in the embodiments discussed herein the primary mobile device 14-7 has a scheduled transmission at a first (future) time for the controller node 12A. The mobile devices 14-3-14-6 will be referred to hereinafter as eligible assistant (EA) mobile devices 14-3-14-6 because such EA mobile devices 14-3-14-6 do not have scheduled transmissions at the first time, and thus may be able to participate in a cluster set in conjunction with the primary mobile device 14-7. However, it should be noted that at another time the primary mobile device 14-7 may serve as an EA mobile device for another mobile device 14, and that any one or more of the EA mobile devices 14-3-14-6 may serve as primary mobile devices 14 at a time when such EA mobile devices 14-3-14-6 have a scheduled transmission for the controller node 12A. Thus, the designation of "primary" or "eligible assistant" is temporal and used herein solely for clarity.

Assume, as discussed above, that the controller node 12A identifies the primary mobile device 14-7 as having a scheduled transmission of data for the controller node 12A at a first time (FIG. 2, block 1000). The controller node 12A identifies a set of EA mobile devices 14-3-14-6 from the plurality of mobile devices 14-1-14-6 (FIG. 2, block 1002).

In one embodiment, the controller node 12A identifies the EA mobile devices 14-3-14-6 based on such EA mobile devices 14-3-14-6 being unscheduled for a transmission at the first time. Thus, the controller node 12A identifies the EA mobile devices 14-3-14-6 as potentially being able to receive the scheduled transmission from the primary mobile device 14-7 and re-transmit the scheduled transmission to the controller node 12A. In contrast, the mobile devices 14-1-14-2, for example, may each have a scheduled transmission at the first time and therefore may be unavailable to serve as an EA mobile device 14.

In another embodiment, one or more of the mobile devices 14-1-14-6 may determine whether the respective mobile device 14-1-14-6 is eligible to assist the primary mobile device 14-7. This determination may be triggered by information received by the mobile devices 14-1-14-6 that indicate the primary mobile device 14-7 is scheduled for a transmission. For example, each mobile device 14 may listen for control signals from the controller node 12A to the primary mobile device 14-7 indicating that the primary mobile device 14-7 has a scheduled transmission. Any suitable control signal may suffice. In one embodiment, the control signal comprises a modulation and coding scheme (MCS) index sent from the controller node 12A to the primary mobile device 14-7. In some embodiments, the control signal may include an initial grant message to the primary mobile device 14-7.

Upon detecting the MCS, each mobile device 14-1-14-6 may determine one or more criterion, and based on the criterion, determine whether the respective mobile device 14-1-14-6 is eligible to assist the primary mobile device 14-7. The criterion may comprise, for example, that the respective mobile device 14-1-14-6 be unscheduled for transmission at the first time and have a sufficiently strong channel between the respective mobile device 14-1-14-6 and the primary mobile device 14-7. If the respective mobile device 14-1-14-6 determines, based on the criterion, that it is eligible to assist the primary mobile device 14-7, the respective mobile device 14-1-14-6 sends to the controller node 12A an eligibility indicator that indicates the respective mobile device 14-1-14-6 is eligible to assist the primary mobile device 14-7. The controller node 12A receives the eligibility indicators, and identifies the set of EA mobile devices 14 based on the receipt of the eligibility indicators. For purposes of illustration, assume that only the EA mobile devices 14-3-14-6 have determined that they meet the desired criteria.

The controller node 12A directs each EA mobile device 14-3-14-6 in the set of EA mobile devices 14-3-14-6 to determine a corresponding mobile device-to-mobile device (MD-MD) channel indicator that identifies a quality of a channel between the respective EA mobile device 14-3-14-6 and the primary mobile device 14-7 (FIG. 2, block 1004). The MD-MD channel indicator may comprise any information that quantifies, in some manner, a quality of a wireless channel between the respective EA mobile device 14-3-14-6 and the primary mobile device 14-7. In the context of a LTE system 10, the MD-MD channel indicator may comprise, for example, a channel quality indicator (CQI) as defined by the respective $3^{rd}$ Generation Partnership Project (3GPP) standards, and which generally comprises a 4-bit integer and is based on an observed signal-to-interference-plus-noise ratio (SINR) between the primary mobile device 14-7 and the respective EA mobile device 14-3-14-6. From the MD-MD channel indicator, other wireless channel metrics may be calculated or otherwise inferred, such as link rates, SINR values, and the like. However, the present embodiments are not limited to any particular channel indicator, and any suitable mechanism for quantifying a quality of a wireless channel may be used.

Wireless channels between devices in FIG. 1 are represented visually by dashed arrows. Thus, in response to the direction from the controller node 12A, the EA mobile device 14-3 determines a corresponding MD-MD channel indicator for the wireless channel 18-2, the EA mobile device 14-4 determines a corresponding MD-MD channel indicator for the wireless channel 18-7, the EA mobile device 14-5 determines a corresponding MD-MD channel indicator for the wireless channel 18-8, and the EA mobile device 14-6 determines a corresponding MD-MD channel indicator for the wireless channel 18-9. In an embodiment wherein the mobile devices 14-3-14-6 send eligibility indicators, such mobile devices 14-3-14-6 may have already determined the corresponding MD-MD channel indicator as part of determining whether such mobile devices 14-3-14-6 were eligible to assist the primary mobile device 14-7, if the eligibility criteria was based on the MD-MD channel indicator. In some embodiments, a mobile device 14 may include the MD-MD channel indicator along with the eligibility indicator.

In embodiments wherein the controller node 12A identifies the EA mobile devices 14-3-14-6 based on such EA mobile devices 14-3-14-6 being unscheduled for transmission at the first time, the EA mobile devices 14-3-14-6 may determine whether the corresponding MD-MD channel indicator complies with a threshold channel indicator before providing the corresponding MD-MD channel indicator to the controller node 12A. The threshold channel indicator may be a predetermined value, or may be based on information provided to the EA mobile devices 14-3-14-6 by the controller node 12A, such as information that identifies the quality of the wireless channel 18-4 between the primary mobile device 14-7 and the controller node 12A. The threshold channel indicator may also be relative to information provided by the controller node 12A, such as a multiple of the MD-CN channel indicator of the wireless channel 18-4. In one embodiment, the threshold channel indicator comprises twice the link rate of the wireless channel 18-4. Thus, if an EA mobile device 14-3-14-6 determines that the corresponding MD-MD channel indicator indicates a link rate between the respective EA mobile device 14-3-14-6 and the primary mobile device 14-7 is less than twice the link rate of the wireless channel 18-4, the respective EA mobile device 14-3-14-6 does not provide the corresponding MD-MD channel indicator to the controller node 12A, and essentially opts out of participating in a cluster set with the primary mobile device 14-7.

Assume for purposes of illustration that the EA mobile devices 14-3 and 14-6 determine that the corresponding MD-MD channel indicators do not comply with the threshold channel indicator, and that the EA mobile devices 14-4 and 14-5 determine that the corresponding MD-MD channel indicators do comply with the threshold channel indicator. The EA mobile devices 14-4 and 14-5 send the corresponding MD-MD channel indicators to the controller node 12A. In some embodiments, the EA mobile devices 14-4 and 14-5 may also send an additional indication that the respective EA mobile device 14-4, 14-5 is eligible for participation in a cluster set with the primary mobile device 14-7, or, alternatively, the sending of the corresponding MD-MD channel indicators themselves may constitute such an indication.

The controller node 12A receives the corresponding MD-MD channel indicators from the EA mobile devices 14-4 and 14-5 (FIG. 2, block 1006). The controller node then determines a cluster set 20 that includes the primary mobile device 14-7 and the EA mobile devices 14-4-14-5 (FIG. 2, block 1008).

While for purposes of illustration only the determination of the cluster set 20 is described herein, it should be appreciated that the controller node 12A may have a number of different primary mobile devices 14 scheduled for future transmissions, and thus, the controller node 12A may determine a corresponding cluster set for each such primary mobile device 14. Similarly, other controller nodes in the system 10, such as the controller node 12N, may also have one or more primary mobile devices 14 for which a cluster set is to be determined. Thus, the process described herein may be relatively concurrently occurring in each controller node 12, for a plurality of different primary mobile devices 14.

Figure 3:
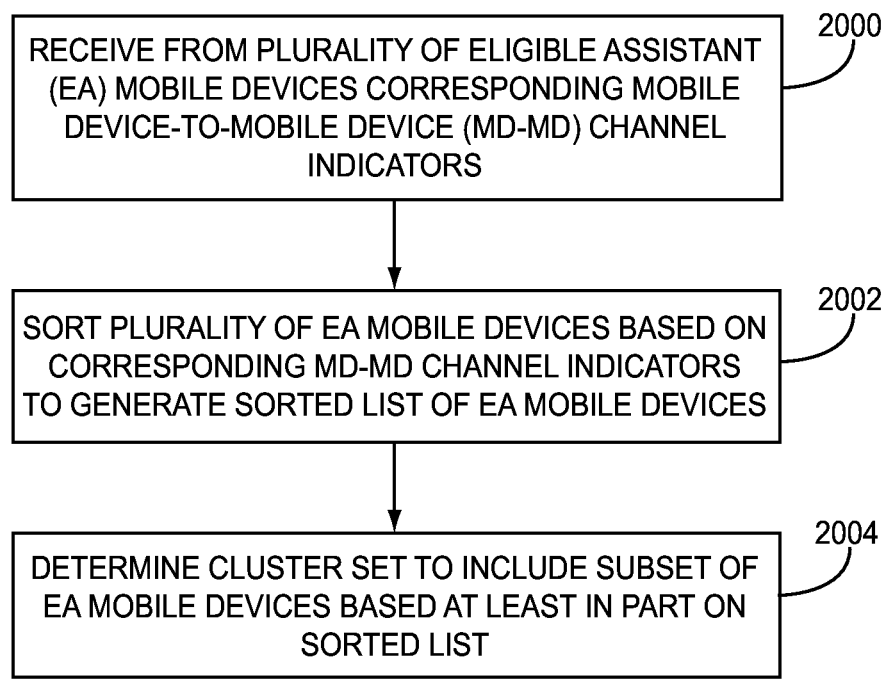
FIG. 3 is a flowchart of a process for using mobile device-to-mobile device (MD-MD) channel indicators to determine the cluster set according to one embodiment.

FIG. 3 is a flowchart of a process for using the MD-MD channel indicators to determine the cluster set 20 according to one embodiment. FIG. 3 will be discussed in conjunction with FIG. 1. In this embodiment, assume that the controller node 12A receives MD-MD channel indicators from the EA mobile devices 14-4, 14-5 and 14-6 (FIG. 3, block 2000). The controller node 12A may then sort, or otherwise rank, a list of the EA mobile devices 14-4, 14-5 and 14-6 based on the MD-MD channel indicators (FIG. 3, block 2002). The sort may be based directly on the values of the MD-MD channel indicators, or may be based on other information derived from such MD-MD channel indicators, such as link rate, SINR, or the like. The controller node 12A may utilize any desired information to sort, or otherwise rank, the list of the EA mobile devices 14-4, 14-5 and 14-6. Ranking may also be based on weighted combinations of one or more criteria, such as the MD-MD channel indicators, MD-CN channel indicators, or the like.

By way of non-limiting example, assume the following:

$r_1$=link rate (bps/Hz) between the primary mobile device 14 and the controller node 12A that the primary mobile device 14 can achieve before a cluster set is formed. An equivalent SINR for this rate is $SINR_1$.

$r_{12}$=link rate (bps/Hz) between the primary mobile device 14 and a respective EA mobile device 14-4-14-6. The equivalent SINR for this rate is $SINR_{12}$.

$r_2$=the link rate between a respective EA mobile device 14-4-14-6 and the controller node 12A. The equivalent SINR for this rate is $SINR_2$.

$r_{A12}$=the aggregate link rate (bps/Hz) of the primary mobile device 14 and a respective EA mobile device 14-4-14-6 when the EA mobile devices 14-4-14-6 transmit together to the controller node 12A. The equivalent SINR for this rate is $SINR_{A12}$.

By way of non-limiting example, the controller node 12A may rank, or sort, the EA mobile devices 14-4, 14-5 and 14-6 based on any one or more of the following:

1. Minimum mobile device link rates: based on a proportion to $\min\{r_{12}, r_2\}$;
2. Closest EA mobile device 14: based on how close the respective EA mobile device 14 is to either the controller node 12A or the primary mobile device 14 (close from a SINR perspective rather than physical distance);
    a. May be proportional to the $r_{12}$;
    b. May be proportional to the $r_2$;
3. Harmonic mean: based on a harmonic mean of $r_{12}$ and $r_2$;
4. Min UE-to-UE and aggregate link rate: based on a proportion to $\min\{r_{12}, r_{A12}\}$; and
5. SLNR based: based on a proportion of the weighted sum of $SINR_1$ and $SLNR_2$ where $SLNR_2$ is the signal to leakage and noise ratio for the respective EA mobile device 14.

The controller node 12A may then determine the cluster set 20 based at least in part on the sorted list (FIG. 3, block 2004). For example, assume that a list of the EA mobile devices 14-4, 14-5 and 14-6 is sorted, or otherwise ranked, in an order of best quality channel to worst quality channel, and the result of the ranking is that EA mobile device 14-4 is ranked first, EA mobile device 14-6 is ranked second, and EA mobile device 14-5 is ranked third. The controller node 12A may access the sorted list, access the MD-MD channel indicator corresponding to the EA mobile device 14-4, and based on the MD-MD channel indicator and a cluster set criterion, determine to add the EA mobile device 14-4 to the cluster set 20. The cluster set criterion may comprise any suitable criterion, such as, for example, a threshold channel indicator. In one embodiment, the criterion may be based on whether the addition of the EA mobile device 14-4 to the cluster set 20 would increase the aggregate data rate of data transfer between the cluster set 20 of mobile devices 14 and the controller node 12A. The controller node 12A traverses the sorted list, and once the controller node 12A determines that an EA mobile device 14 on the sorted list will not increase the aggregate data rate of the cluster set 20, the controller node 12A may end the process. In another embodiment, the controller node 12A limits the cluster set 20 to a single EA mobile device 14, and selects the first EA mobile device 14-4 on the sorted list as the only EA mobile device 14 in the cluster set 20.

Figure 4:
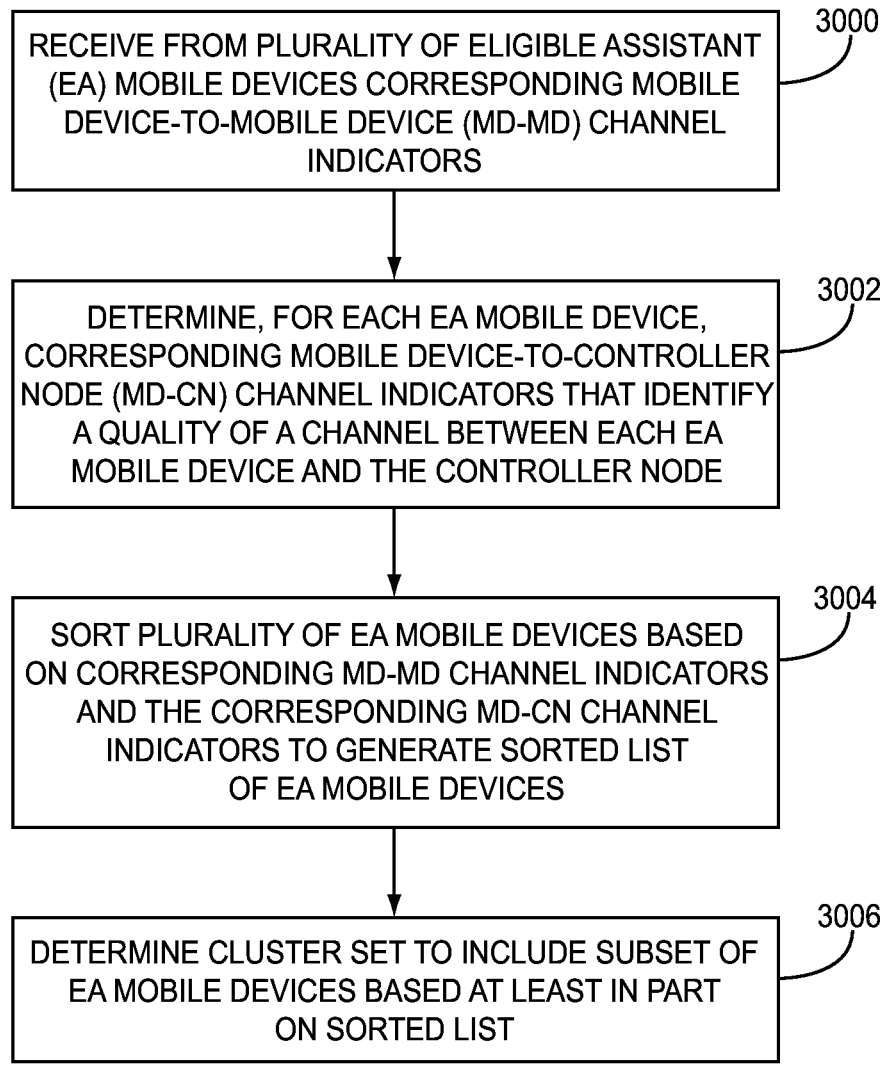
FIG. 4 is a flowchart of a process for using the MD-MD channel indicators in combination with mobile device-to-controller node (MD-CN) channel indicators to determine the cluster set according to one embodiment.

FIG. 4 is a flowchart of a process for using the MD-MD channel indicators in combination with mobile device-to-controller node (MD-CN) channel indicators to determine the cluster set 20 according to one embodiment. FIG. 4 will be discussed in conjunction with FIG. 1. Assume, as discussed with regard to FIG. 3, that the controller node 12A receives MD-MD channel indicators from the EA mobile devices 14-4-14-6 (FIG. 4, block 3000). In this embodiment, each of the EA mobile devices 14-4-14-6 may also communicate a reference signal that is received by the controller node 12A. The controller node 12A may use the respective reference signals to determine corresponding MD-CN channel indicators that identify the quality of the respective wireless channels 18-3, 18-5 and 18-6 between the controller node 12A and the EA mobile devices 14-4-14-6 (FIG. 4, block 3002).

The controller node 12A may then sort, or otherwise rank, a list of the EA mobile devices 14-4-14-6 based on the MD-MD channel indicators and on the MD-CN channel indicators (FIG. 4, block 3004). The sort may be based directly on the values of the MD-MD channel indicators and MD-CN channel indicators, or may be based on information derived from such MD-MD channel indicators and MD-CN channel indicators, such as link rates, SINRs, or the like.

As discussed above with reference to FIG. 3, the controller node 12A may sort or otherwise rank the list of the EA mobile devices 14-4-14-6 based on any desired criteria or combination of information, including the MD-MD channel indicators, MD-CN channel indicators, and any other channel indicators, such as the channel indicator that identifies the channel quality between the primary mobile device 14-7 and the controller node 12A. The controller node 12A then traverses the sorted list and determine the cluster set 20 to include a subset of the EA mobile devices 14-4-14-6 (FIG. 4, block 3006).

Figure 5:
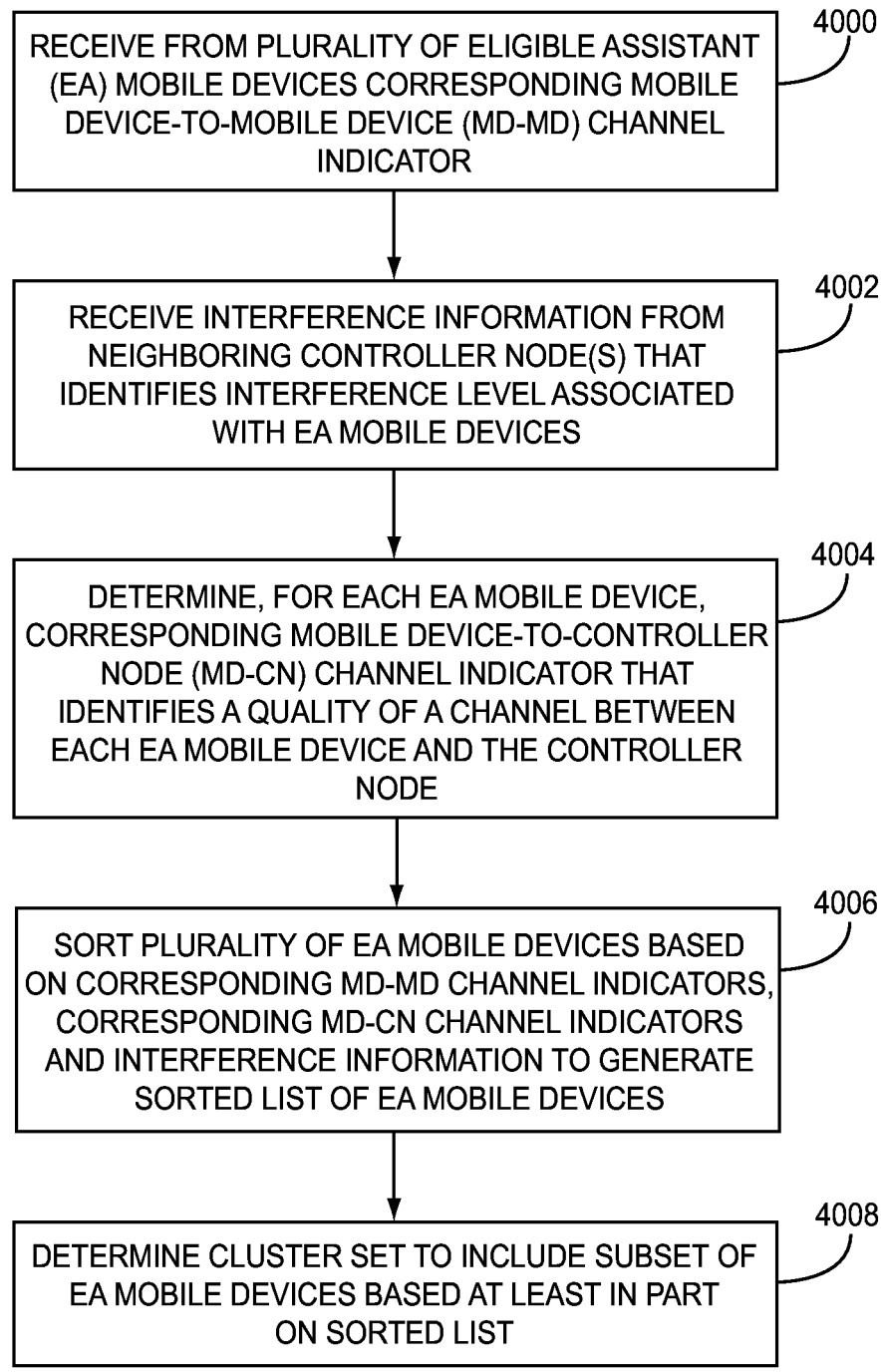
FIG. 5 is a flowchart of a process for using interference information in the determination of a cluster set according to one embodiment.

FIG. 5 is a flowchart of a process for using interference information obtained from a neighboring controller node to determine which EA mobile devices 14 are to be included in a cluster set. FIG. 5 will be discussed in conjunction with FIG. 4. Assume, as discussed above with regard to FIGS. 3 and 4, that the controller node 12A receives MD-MD channel indicators from the EA mobile devices 14-4-14-6 (FIG. 5, block 4000). In this embodiment, the controller node 12N measures the interference seen by the controller node 12N when the EA mobile devices 14-4-14-6 transmit data. For example, as discussed above with regard to FIG. 4, each EA mobile device 14-4-14-6 may communicate a reference signal that is received by both the controller node 12A and the controller node 12N. The controller node 12N may use such reference signal to determine the level of interference caused by the transmission of the corresponding EA mobile device 14-4-14-6. The controller node 12N provides this interference information to the controller node 12A via the network 16 (FIG. 5, block 4002).

As discussed above with reference to FIG. 4, block 3000, the controller node 12A may also determine for each of the EA mobile devices 14-4-14-6 corresponding MD-CN channel indicators that identify the quality of the wireless channels 18-3, 18-5 and 18-6 between the mobile devices 14-4-14-6 and the controller node 12A (FIG. 5, block 4004). In one embodiment, the controller node 12A may then sort the EA mobile devices 14-4-14-6 based on the MD-MD channel indicators, MD-CN channel indicators, and/or the interference information received from the controller node 12N to generate a sorted list of the EA mobile devices 14-4-14-6 (FIG. 5, block 4006).

Alternatively, in another embodiment, the controller node 12A may use the interference information to include or exclude one or more particular EA mobile devices 14-4-14-6. For example, the controller node 12A may only include the respective EA mobile device 14 if the interference information for the respective EA mobile device 14 indicates that the interference with the controller node 12N is below an interference level threshold. As discussed above with regard to FIGS. 3 and 4, the controller node 12A may then determine a cluster set to include a subset of the EA mobile devices 14-4-14-6, based at least in part on the sorted list (FIG. 5, block 4008). While for purposes of illustration the controller node 12A is described as receiving interference information from only the controller node 12N, it should be apparent that the controller node 12A may receive interference information from any number of neighboring controller nodes 12 that may experience interference caused by transmissions from one or more of the EA mobile devices 14-4-14-6.

Figure 6A:
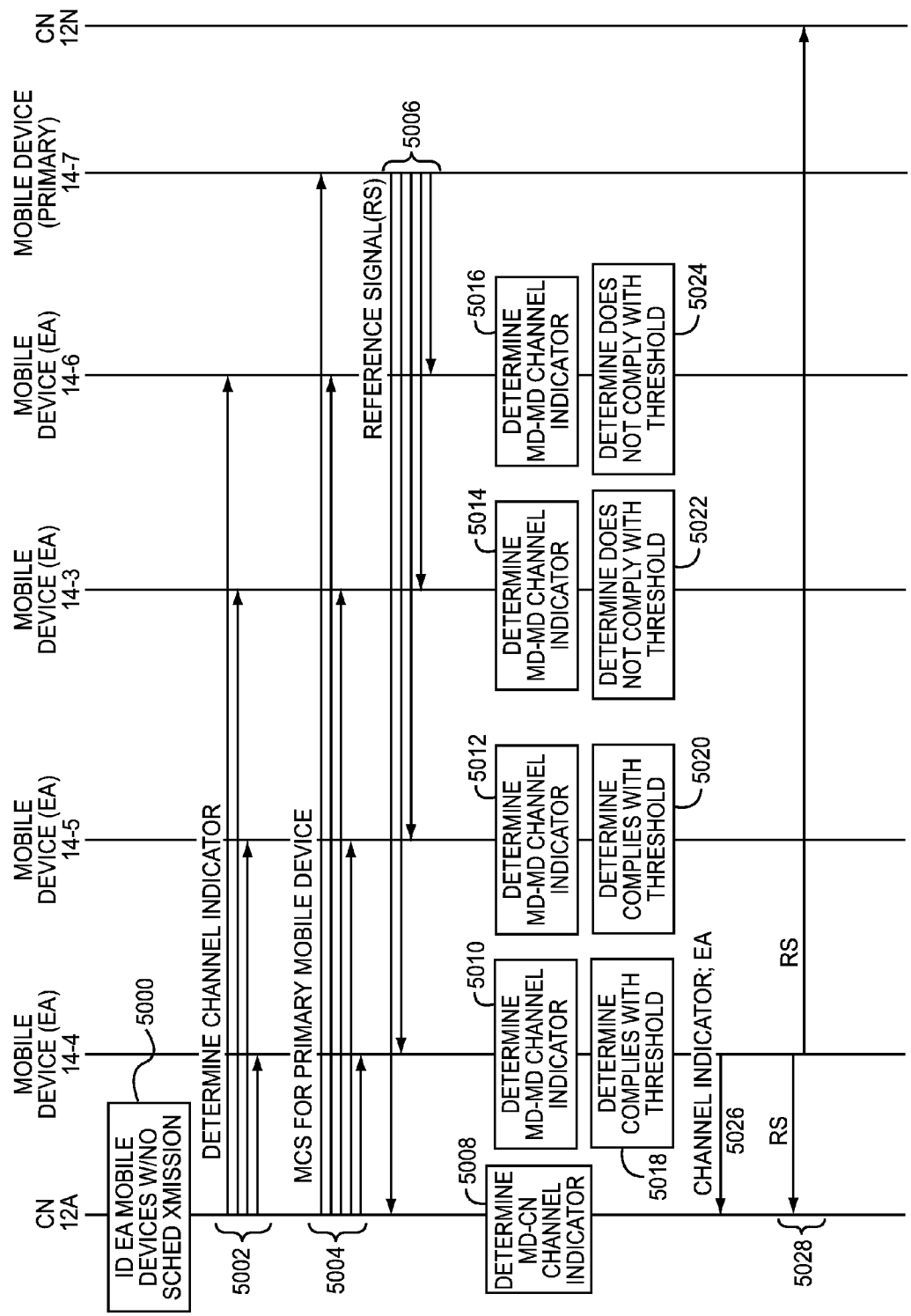
FIGS. 6A-6B are message flow diagrams illustrating an example message flow between devices during a discovery phase according to one embodiment.
Figure 6B:
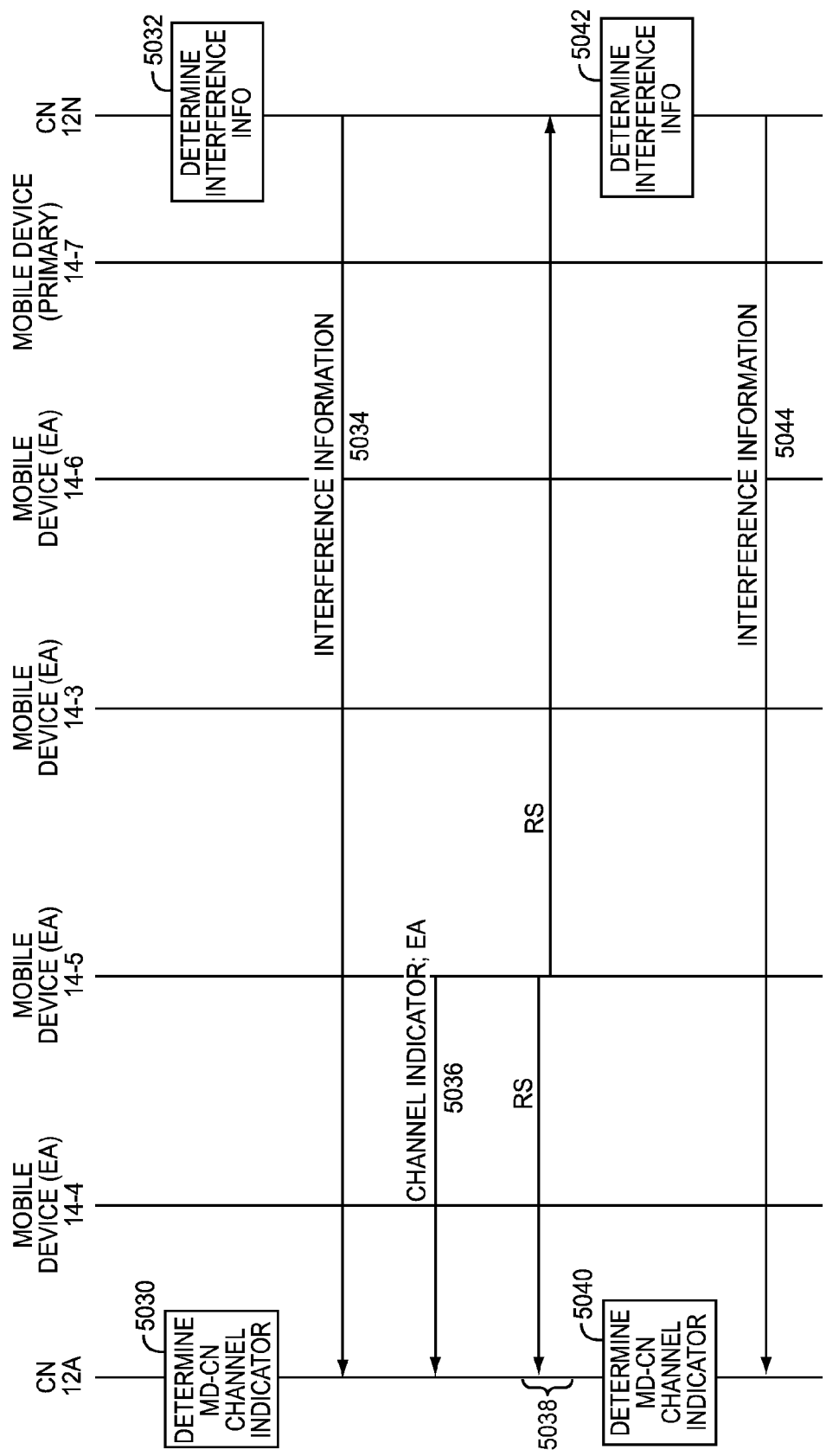

FIGS. 6A-6B are message flow diagrams illustrating an example message flow between devices during a discovery phase wherein EA mobile devices 14 that may be added to the cluster set 20 are identified by the controller node 12A, according to one embodiment. Assume that the primary mobile device 14-7 has a scheduled transmission for the controller node 12A at a first time. The controller node 12A identifies the EA mobile devices 14-3-14-6 as having no transmissions scheduled at the first time (step 5000). The controller node 12A sends the EA mobile devices 14-3-14-6 a direction to determine a corresponding MD-MD channel indicator that identifies a quality of a wireless channel between the respective EA mobile devices 14-3-14-6 and the primary mobile device 14-7 (step 5002). The controller node 12A may also send a modulation and coding scheme (MCS) index to the primary mobile device 14-7, which directs the primary mobile device 14-7 to use a particular MCS for the scheduled transmission (step 5004). Because the EA mobile devices 14-3-14-6 have received the direction to determine corresponding MD-MD channel indicators that identify the quality of the wireless channels between the respective EA mobile devices 14-3-14-6 and the primary mobile device 14-7, the EA mobile devices 14-3-14-6 may also listen for and note the MCS index provided to the primary mobile device 14-7.

The primary mobile device 14-7 communicates a reference signal that is received by the controller node 12A, and the EA mobile devices 14-3-14-6. The controller node 12A uses the reference signal to determine the MD-CN channel indicator that identifies the quality of the wireless channel between the controller node 12A and the primary mobile device 14-7 (step 5008). Similarly, each of the EA mobile devices 14-3-14-6 uses the received reference signal to determine the corresponding MD-MD channel indicators that identify the quality of the wireless channels between the respective EA mobile devices 14-3-14-6 and the primary mobile device 14-7 (steps 5010-5016).

Assume that the EA mobile device 14-4 determines that the corresponding MD-MD channel indicator complies with the channel indicator threshold (step 5018), the EA mobile device 14-5 also determines that the corresponding MD-MD channel indicator complies with the channel indicator threshold (step 5020), but the EA mobile devices 14-3 and 14-6 determine that the corresponding MD-MD channel indicators do not comply with the threshold channel indicator (steps 5022-5024).

In response to determining that the corresponding MD-MD channel indicator complies with the threshold channel indicator, the EA mobile device 14-4 communicates the MD-MD channel indicator to the controller node 12A (step 5026). The EA mobile device 14-4 also communicates a reference signal that is received by the controller nodes 12A and 12N (step 5028). The controller node 12A uses the reference signal to determine a corresponding MD-CN channel indicator that identifies a quality of the channel between the controller node 12A and the EA mobile device 14-4 (step 5030). The controller node 12N may use the reference signal to determine a corresponding interference level between the controller node 12N and the EA mobile device 14-4 (step 5032). The controller node 12N may send interference information that identifies the corresponding signal interference level to the controller node 12A (step 5034).

In response to determining that the corresponding MD-MD channel indicator complies with the threshold channel indicator, the EA mobile device 14-5 also communicates the MD-MD channel indicator to the controller node 12A (step 5036). The EA mobile device 14-5 also communicates a reference signal that is received by the controller nodes 12A and 12N (step 5038). The controller node 12A uses the reference signal to determine a corresponding MD-CN channel indicator that identifies a quality of the channel between the controller node 12A and the EA mobile device 14-5 (step 5040). The controller node 12N may use the reference signal to determine a corresponding signal interference level between the controller node 12N and the EA mobile device 14-5 (step 5042). The controller node 12N may send interference information that identifies the corresponding signal interference level to the controller node 12A (step 5044).

Accordingly, after the process described above, the controller node 12A has a corresponding MD-CN channel indicator that indicates a quality of the channel between the controller node 12A and the primary mobile device 14-7, corresponding MD-MD channel indicators that indicate a quality of the respective channels between the EA mobile devices 14-4, 14-5 and the primary mobile device 14-7, MD-CN channel indicators that indicate a quality of the respective channels between the EA mobile devices 14-4, 14-5 and the controller node 12A, and interference information that identifies interference levels by the EA mobile devices 14-4, 14-5 from the context of the controller node 12N.

Figure 7A:
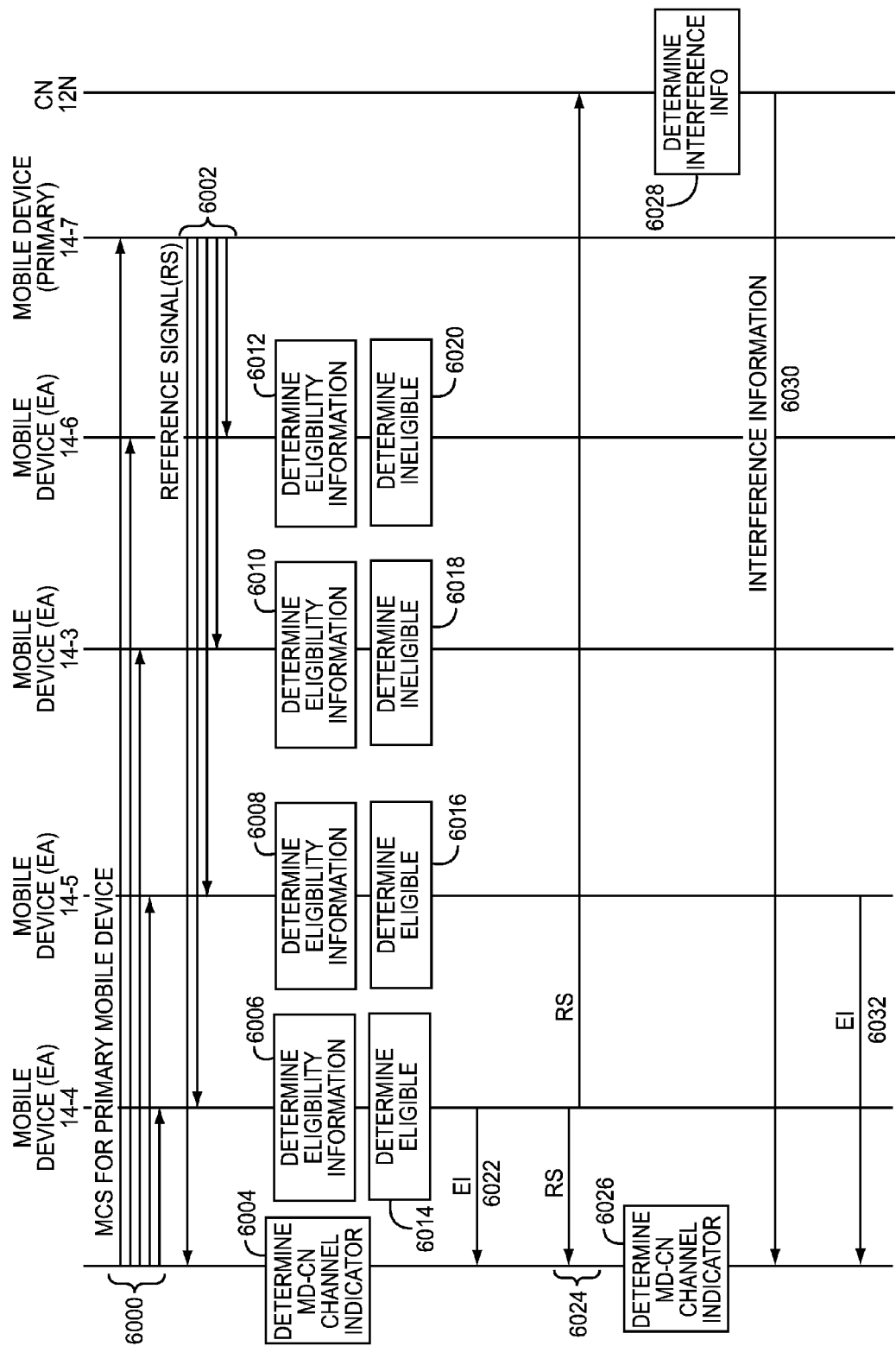
FIGS. 7A-7B are message flow diagrams illustrating an example message flow between devices during a discovery phase according to another embodiment.
Figure 7B:
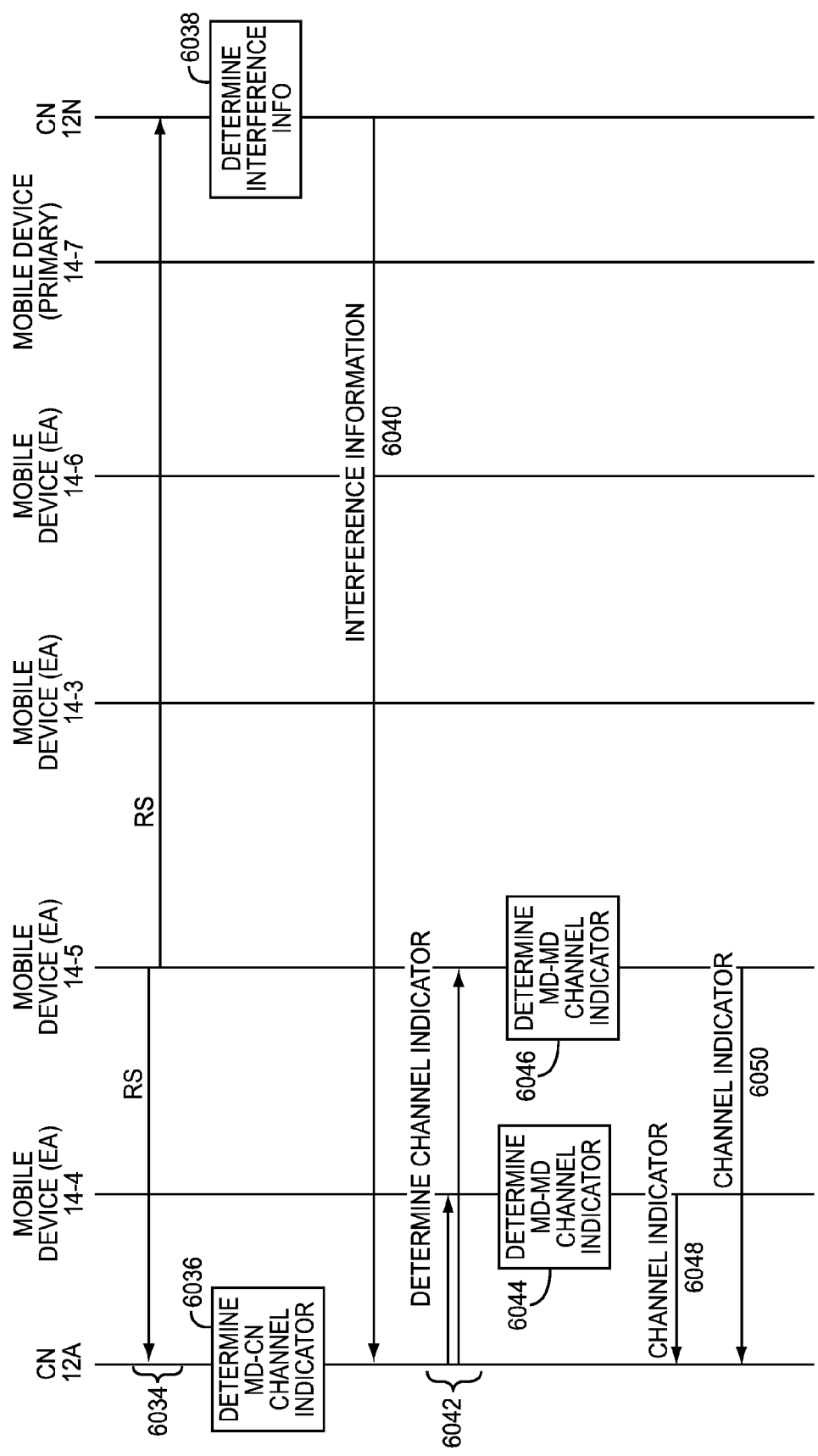

FIGS. 7A-7B are message flow diagrams illustrating an example message flow between devices during a discovery phase wherein EA mobile devices 14 that may be added to the cluster set 20 are identified by the controller node 12A, according to another embodiment. Assume that the primary mobile device 14-7 has a scheduled transmission for the controller node 12A at a first time. The controller node 12A sends an MCS index to the primary mobile device 14-7, which directs the primary mobile device 14-7 to use a particular MCS for the scheduled transmission (step 6000). The EA mobile devices 14-3-14-6 are configured to listen for control signals, such as the MCS, and detect the MCS.

The primary mobile device 14-7 communicates a reference signal (RS) that is received by the controller node 12A, and the EA mobile devices 14-3-14-6 (step 6002). The controller node 12A uses the reference signal to determine the MD-CN channel indicator that identifies the quality of the wireless channel between the controller node 12A and the primary mobile device 14-7 (step 6004). Each of the EA mobile devices 14-3-14-6 determines eligibility information necessary to determine whether the EA mobile devices 14-3-14-6 may be eligible to assist the primary mobile device 14-7 (steps 6006-6012). Such eligibility information is based on any desired eligibility criteria, such as whether or not the respective EA mobile device 14-3-14-6 is unscheduled for a transmission at the first time, an MD-MD channel indicator that identifies the quality of the wireless channel between the respective EA mobile device 14-3-14-6 and the primary mobile device 14-7, or the like. If the eligibility criteria includes the MD-MD channel indicator that identifies the quality of the wireless channel between the respective EA mobile device 14-3-14-6 and the primary mobile device 14-7, the EA mobile devices 14-3-14-6 may use the received reference signal to determine the corresponding MD-MD channel indicators that identify the quality of the wireless channels between the respective EA mobile devices 14-3-14-6 and the primary mobile device 14-7.

Assume that the EA mobile device 14-4 determines that it is eligible to assist the primary mobile device 14-7 based on the eligibility criteria (step 6014). The EA mobile device 14-5 also determines that it is eligible to assist the primary mobile device 14-7 based on the eligibility criteria (step 6016), but the EA mobile devices 14-3 and 14-6 determine that they are ineligible to assist the primary mobile device 14-7 based on the eligibility criteria (steps 6018, 6020).

In response to determining that it is eligible to assist the primary mobile device 14-7, the EA mobile device 14-4 communicates an eligibility indicator (EI) to the controller node 12A (step 6022). The EA mobile device 14-4 also communicates a reference signal (RS) that is received by the controller nodes 12A and 12N (step 6024). The controller node 12A uses the reference signal to determine a corresponding MD-CN channel indicator that identifies a quality of the channel between the controller node 12A and the EA mobile device 14-4 (step 6026). The controller node 12N may use the reference signal to determine a corresponding interference level between the controller node 12N and the EA mobile device 14-4 (step 6028). The controller node 12N may send interference information that identifies the corresponding signal interference level to the controller node 12A (step 6030).

In response to determining that it is eligible to assist the primary mobile device 14-7, the EA mobile device 14-5 also communicates an eligibility indicator (EI) to the controller node 12A (step 6032). The EA mobile device 14-5 also communicates a reference signal (RS) that is received by the controller nodes 12A and 12N (step 6034). The controller node 12A uses the reference signal to determine a corresponding MD-CN channel indicator that identifies a quality of the channel between the controller node 12A and the EA mobile device 14-5 (step 6036). The controller node 12N may use the reference signal to determine a corresponding signal interference level between the controller node 12N and the EA mobile device 14-5 (step 6038). The controller node 12N may send interference information that identifies the corresponding signal interference level to the controller node 12A (step 6040).

The controller node 12A may then send the EA mobile devices 14-4, 14-5 a direction to determine the corresponding MD-MD channel indicator that identifies the quality of the wireless channel between the respective EA mobile devices 14-4, 14-5 and the primary mobile device 14-7 (step 6042).

In response, the EA mobile device 14-4 determines the MD-MD channel indicator that identifies the quality of the wireless channel between the EA mobile device 14-4 and the primary mobile device 14-7, and sends the MD-MD channel indicator to the controller node 12A (steps 6044, 6046). Similarly, the EA mobile device 14-5 determines the MD-MD channel indicator that identifies the quality of the wireless channel between the EA mobile device 14-5 and the primary mobile device 14-7, and sends the MD-MD channel indicator to the controller node 12A (steps 6048, 6050).

Accordingly, after the process described above, the controller node 12A has a corresponding MD-CN channel indicator that indicates a quality of the channel between the controller node 12A and the primary mobile device 14-7, corresponding MD-MD channel indicators that indicate a quality of the respective channels between the EA mobile devices 14-4, 14-5 and the primary mobile device 14-7, MD-CN channel indicators that indicate a quality of the respective channels between the EA mobile devices 14-4, 14-5 and the controller node 12A, and interference information that identifies interference levels by the EA mobile devices 14-4, 14-5 from the context of the controller node 12N.

Figure 8:
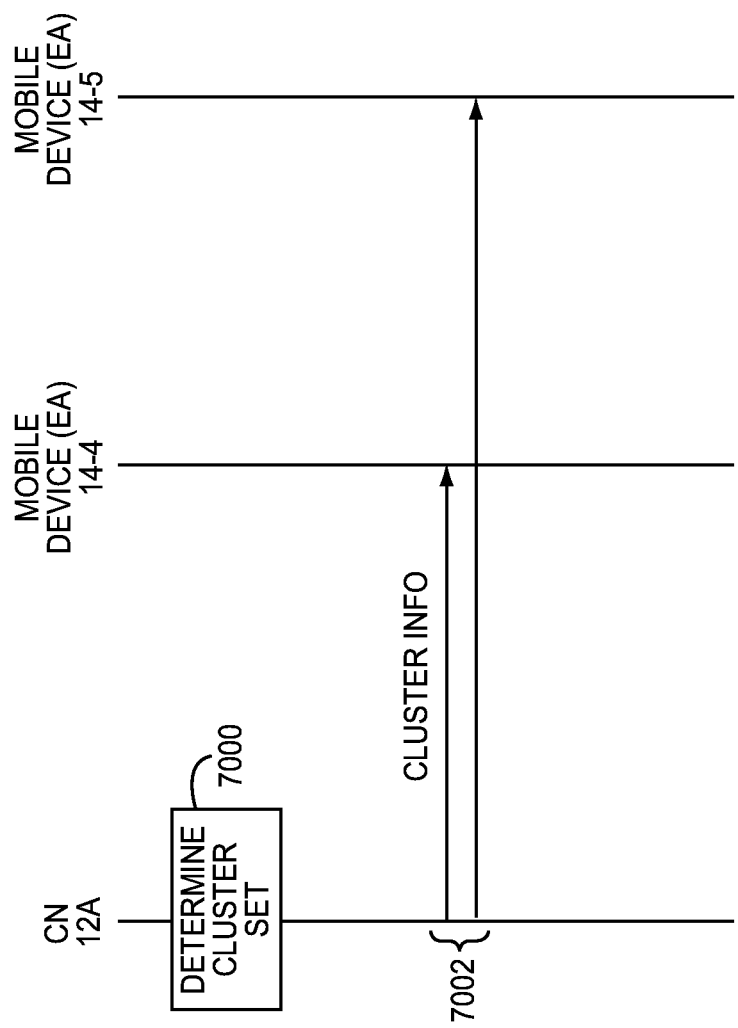
FIG. 8 is a message flow diagram illustrating an example message flow between devices during a cluster setup phase according to one embodiment.

FIG. 8 is a message flow diagram illustrating an example message flow between devices during a cluster setup phase according to one embodiment. The controller node 12A uses the information determined in the process described with reference to FIGS. 6A-6B to determine a cluster set that includes the EA mobile devices 14-4, 14-5 and the primary mobile device 14-7 (step 7000). The process by which the controller node 12A may determine the cluster set may include, for example, any one or more of the processes discussed above with reference to FIGS. 3-5. The controller node 12A then communicates cluster information to the EA mobile devices 14-4, 14-5 (step 7002). The cluster information may comprise any suitable information that EA mobile devices 14-4, 14-5 that they are part of a cluster set that includes the primary mobile device 14-7, and that such respective EA mobile devices 14-4, 14-5 should therefore listen for and retransmit the scheduled transmission transmitted from the primary mobile device 14-7 to the controller node 12A. The cluster information may include any other suitable or desirable information, such as, for example, the MCS index used by the primary mobile device 14-7 to modulate and code data. Note that the primary mobile device 14-7 may not be informed by the controller node 12A that the primary mobile device 14-7 is part of the cluster set.

Figure 9:
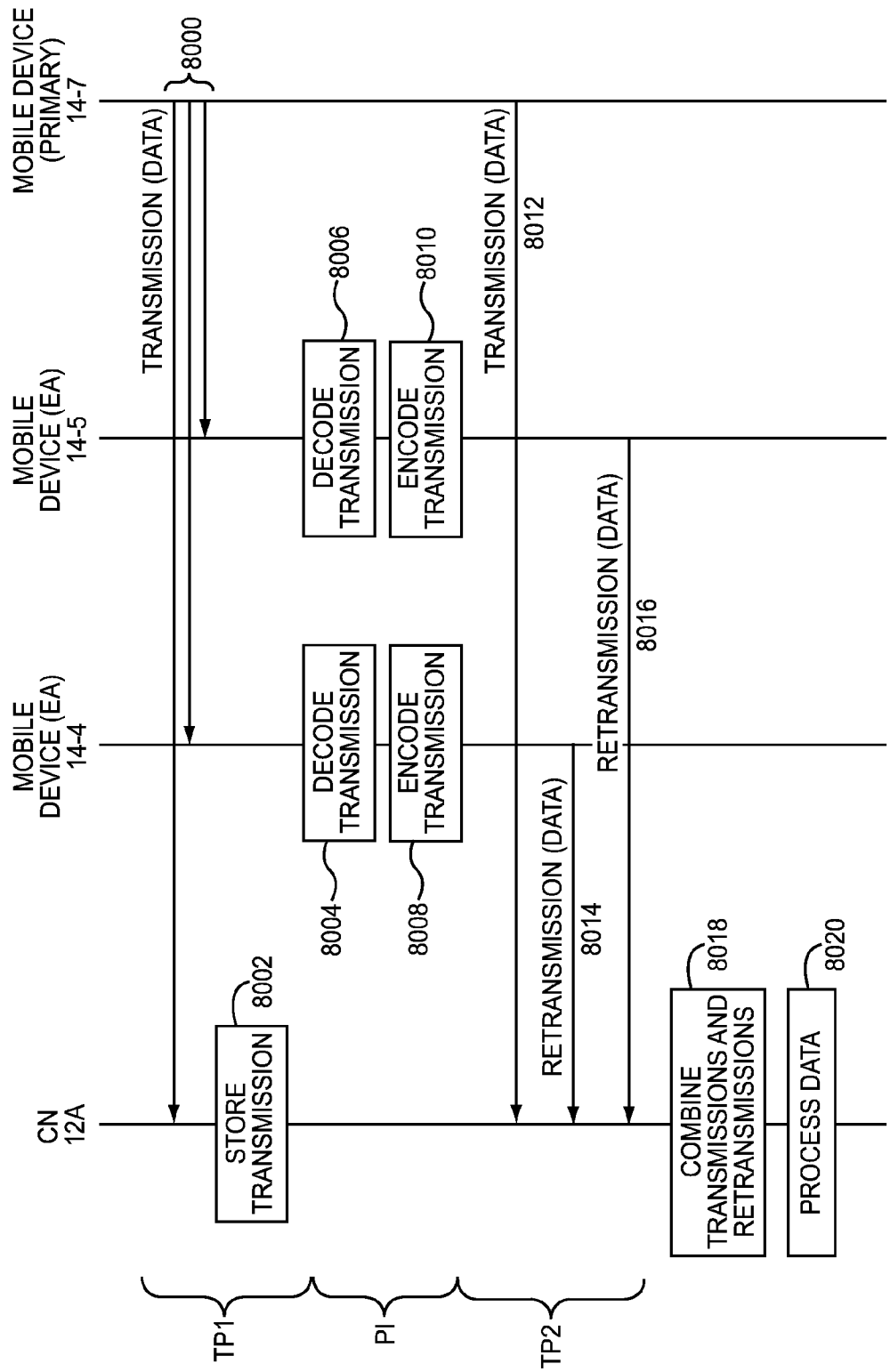
FIG. 9 is a message flow diagram illustrating an example message flow between devices in a cluster set implementing spatial diversity via a two-phase transmission according to one embodiment.

FIG. 9 is a message flow diagram illustrating an example message flow between devices in a cluster set implementing spatial diversity via a two-phase transmission according to one embodiment. As discussed above with regard to FIG. 8, assume that the EA mobile devices 14-4, 14-5 have received cluster information that indicated to the EA mobile devices 14-4, 14-5 that they were in a cluster set with the primary mobile device 14-7. During a first transmission period TP1, the primary mobile device 14-7 sends the scheduled transmission to the controller node 12A (step 8000). A transmission period may be defined by any desired criteria, such as, by way of non-limiting example, the time taken to transmit a packet, a HARQ process interval, a transmission time interval (TTI), or a scheduled interval. The controller node 12A and EA mobile devices 14-4, 14-5 receive the scheduled transmission. The controller node 12A buffers, or otherwise stores, the scheduled transmission, and attempts to decode the scheduled transmission (step 8002). If the controller node 12A is able to decode the transmission, the controller node 12A may ignore the subsequent retransmissions by the EA mobile devices 14-4, 14-5, or alternatively, may provide feedback to the EA mobile devices 14-4, 14-5 that retransmissions are not necessary (not illustrated).

Either as part of the first transmission period TP1 (not illustrated) or as part of a separate processing interval PI, the EA mobile devices 14-4, 14-5 decode the received scheduled transmissions in accordance with the MCS, and encode the scheduled transmissions in accordance with the MCS (steps 8004-8010).

During a second transmission period TP2, the primary mobile device 14-7 retransmits the scheduled transmission (step 8012). For example, the primary mobile device 14-7 may have received a negative acknowledge character protocol message (NACK) indicating that the controller node 12A did not successfully receive the scheduled transmission. In some embodiments, EA mobile devices 14 may overhear the NACK. Also during the second transmission period TP2, the EA mobile devices 14-4, 14-5 each retransmit the scheduled transmission to the controller node 12A (steps 8014-8016). The controller node 12A receives the retransmissions, and soft combines the transmissions of the primary mobile device 14-7 with the retransmissions received from the EA mobile devices 14-4, 14-5 (step 8018). The controller node 12A then processes the data (step 8020). The soft combining of the transmissions and retransmissions may be based on any soft combining mechanism, including being based on soft log likelihood ratios.

Figure 10:
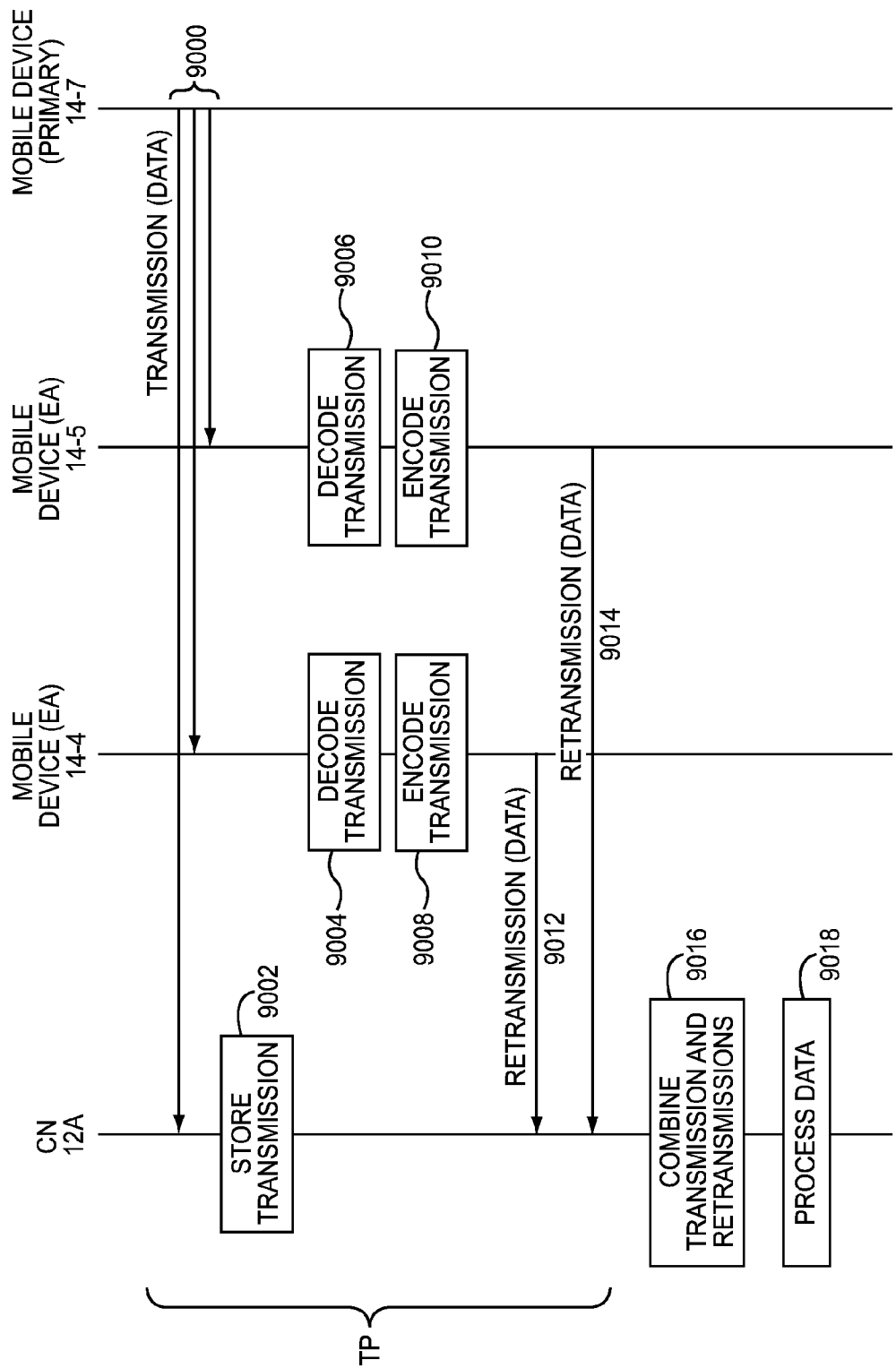
FIG. 10 is a message flow diagram illustrating an example message flow between devices in a cluster set implementing spatial diversity via a one-phase transmission according to one embodiment.

FIG. 10 is a message flow diagram illustrating an example message flow between devices in a cluster set implementing spatial diversity via a one-phase transmission according to one embodiment. In this embodiment, during a transmission period TP, the primary mobile device 14-7 sends the scheduled transmission to the controller node 12A (step 9000). The controller node 12A and EA mobile devices 14-4, 14-5 receive the scheduled transmission. The controller node 12A buffers, or otherwise stores, the scheduled transmission received from the primary mobile device 14-7 (step 9002). In this embodiment, the EA mobile devices 14-4, 14-5 are capable of decoding the received scheduled transmissions in accordance with the MCS, and encoding the scheduled transmissions in accordance with the MCS in the same transmission period TP (steps 9004-9010).

During the transmission period TP, the EA mobile devices 14-4, 14-5 each retransmit the scheduled transmission to the controller node 12A (steps 9012-9014). The controller node 12A receives the retransmissions, and soft combines the original transmission of the primary mobile device 14-7 with the retransmissions received from the EA mobile devices 14-4, 14-5 (step 9016). The controller node 12A then processes the data (step 9018).

Figure 11:
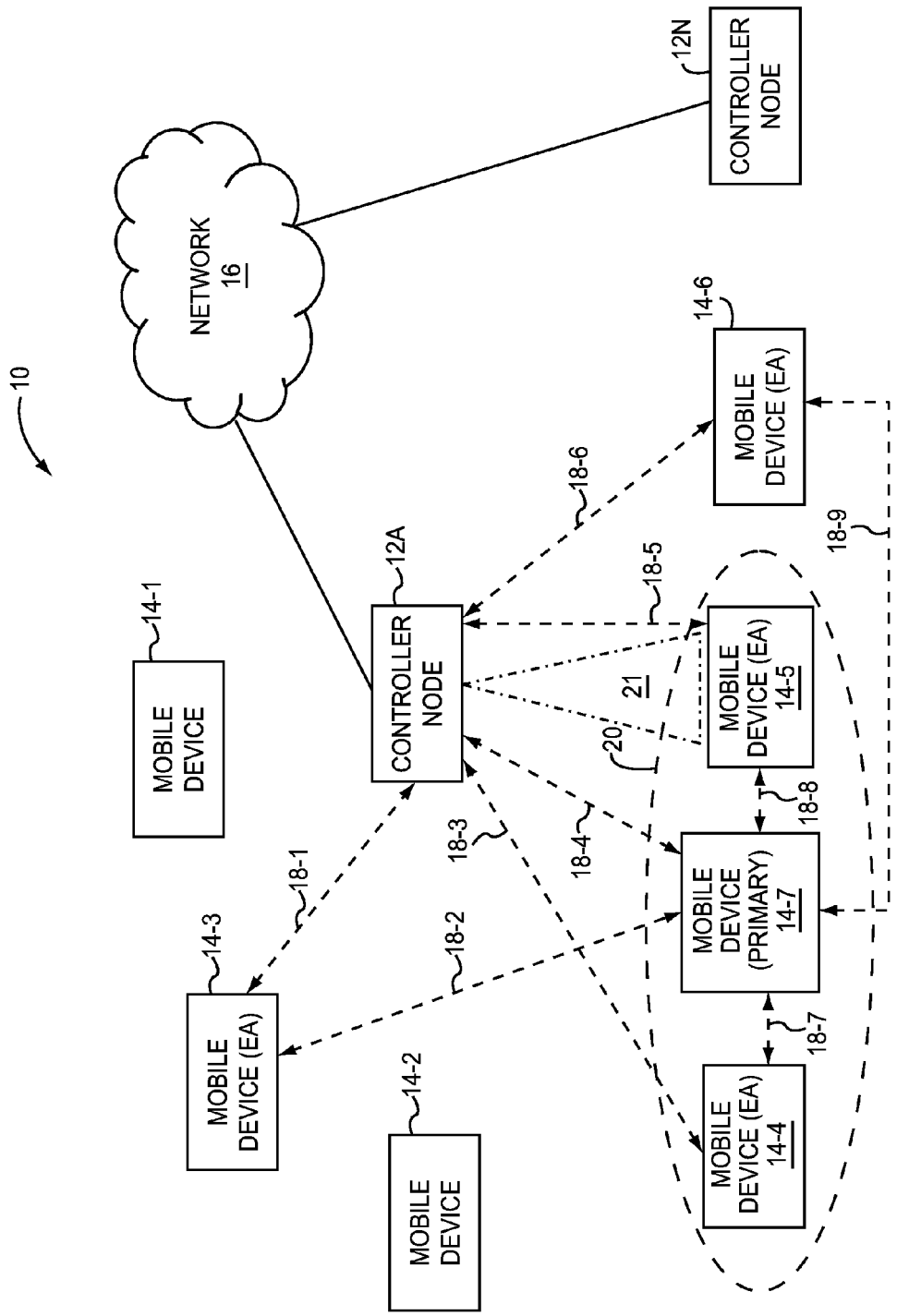
FIG. 11 is a block diagram of a system in which additional embodiments may be practiced.

FIG. 11 is a block diagram of the system 10 in which additional embodiments may be practiced. In one embodiment, the controller node 12A receives interference information that identifies a level of interference caused by the EA mobile device 14-5 during a transmission. In response, the controller node 12A directs the EA mobile device 14-5 to retransmit the scheduled transmission of the primary mobile device 14-7 at a lower power level than a power level previously used by the EA mobile device 14-5. The controller node 12A then directs a receive beam 21 at the EA mobile device 14-5. The EA mobile device 14-5 may then retransmit the scheduled transmission at the lower power level, reducing interference seen by the controller node 12A.

In another embodiment, the neighboring controller node 12N may steer a null in a direction toward the EA mobile device 14-5 to reduce the interference seen by the controller node 12N from the EA mobile device 14-5. In this embodiment, the EA mobile device 14-5 may retain a higher transmit power that may benefit the aggregate throughput of the cluster set 20.

In another embodiment, the controller node 12A may define a virtual precoding matrix for the EA mobile devices 14-4, 14-5 in the cluster set 20. The controller node 12A sends a corresponding precoding matrix index to the EA mobile devices 14-4, 14-5, and the primary mobile device 14-7 for application with the scheduled transmission. With respect to the EA mobile devices 14-4, 14-5, this information may be sent, for example, as part of the cluster information communicated from the controller node 12A to the EA mobile devices 14-4, 14-5 upon determining the cluster set 20. Each of the EA mobile devices 14-4, 14-5 and the primary mobile device 14-7 multiplies the transmission in accordance with the precoding matrix.

The embodiments discussed herein with respect to FIGS. 1-9 have involved each controller node 12 determining cluster sets for those primary mobile devices 14 serviced by the respective controller node 12. In such embodiments, as discussed above, each controller node 12 may obtain or otherwise determine various channel indicators, and exchange information with other controller nodes 12, and based on such information, relatively independently determine one or more cluster sets for primary mobile devices 14 that have scheduled transmissions. This may be referred to herein as distributed, or "greedy" clustering.

While for purposes of brevity this distributed clustering process has been discussed for only one primary mobile device 14, in practice, the controller node 12A may determine such information for many primary mobile devices 14 which have future scheduled transmissions. In such situations, the controller node 12A may prioritize the determination of cluster sets for the primary mobile devices 14. The prioritization may be based on any desired criterion or criteria. In one embodiment, the controller node 12A may prioritize cluster determination based on a performance objective associated with the controller node 12A or the system 10. For example, if the performance objective is average throughput, the controller node 12A may prioritize the primary mobile devices 14 based on highest throughput, such as highest bits per second (bps)/Hz, for example. Thus the primary mobile devices 14 that have the highest rate in bps/Hz are clustered before primary mobile devices 14 with lower rates in bps/Hz.

In another embodiment, the performance metric may be based on a concept of "fairness," wherein the clustering is prioritized in reverse order of throughput, such that primary mobile devices 14 that have lower rates in bps/Hz are clustered before primary mobile devices 14 with higher rates in bps/Hz. In other embodiments, the performance metric may be based on which primary mobile devices 14 will exhibit the largest gains.

Figure 12:
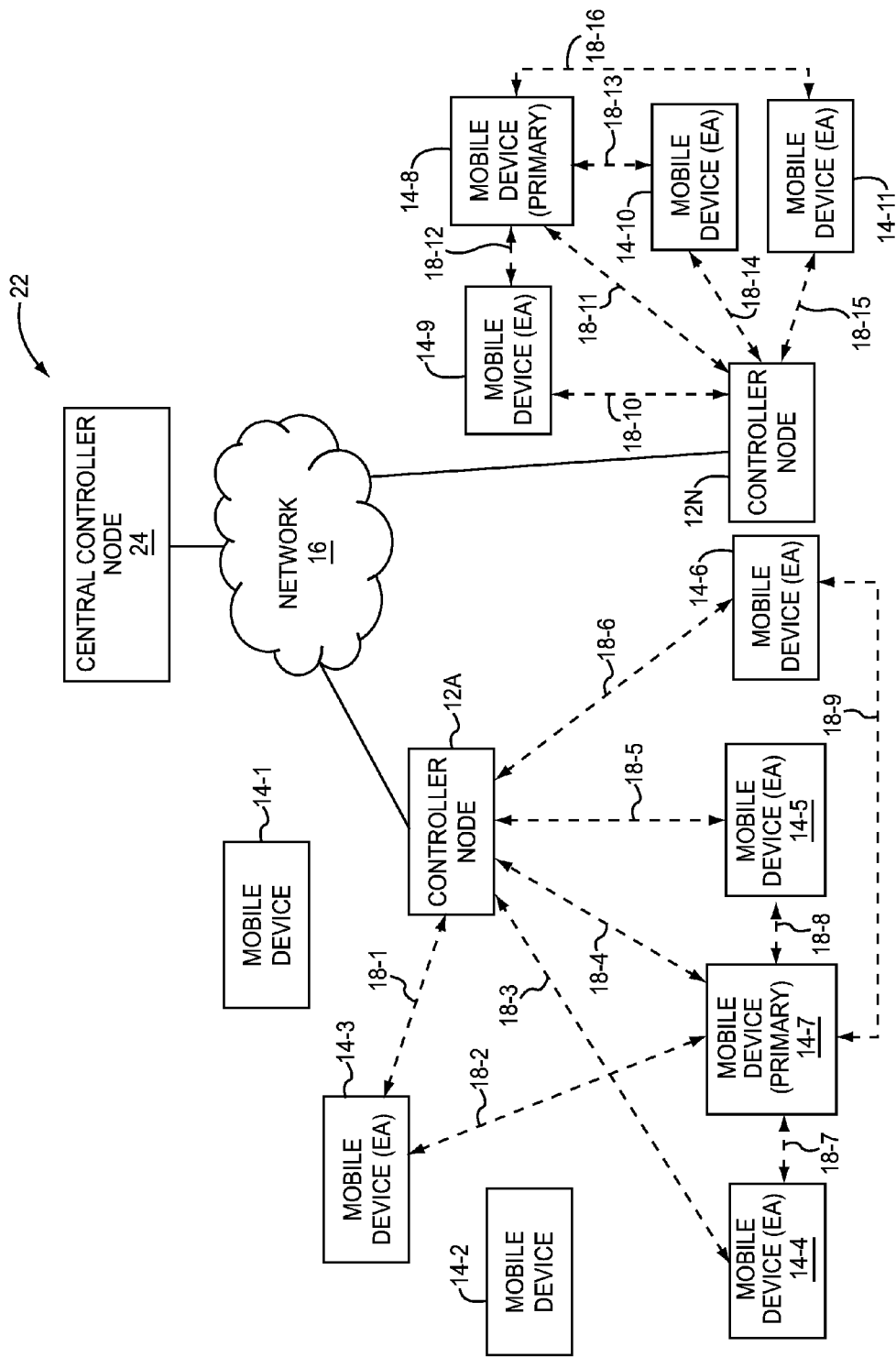
FIG. 12 is a block diagram of a system in which cluster determination may be centralized.
Figure 13:
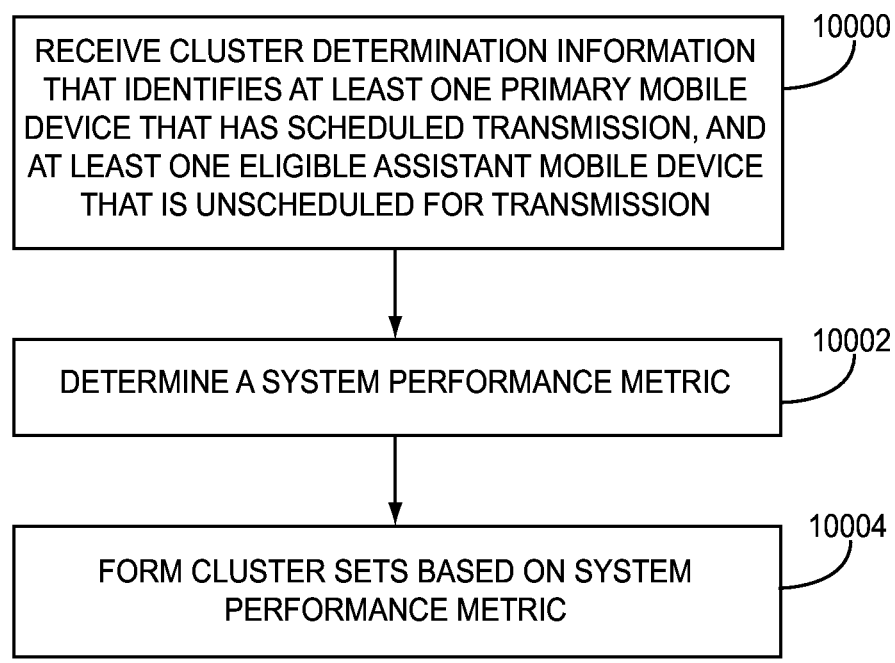
FIG. 13 is a flow chart of a process for centralized cluster determination according to one embodiment.

FIG. 12 is a block diagram of a system 22 in which cluster determination for all controller nodes 12 is performed by a central controller node 24. This may be referred to herein as centralized, or "exhaustive," clustering. FIG. 13 is a flow chart of a process for centralized cluster determination according to one embodiment, and will be discussed in conjunction with FIG. 12.

Referring first to FIG. 12, assume that the primary mobile device 14-7 has a scheduled transmission for the controller node 12A at the first time. Further assume that the controller node 12N services a primary mobile device 14-8 that has a scheduled transmission for the controller node 12N at the first time. The controller node 12A determines that the set of EA mobile devices 14-3-14-6 are unscheduled for transmission at the first time, and may direct each of the EA mobile devices 14-3-14-6 in the set to determine corresponding MD-MD channel indicators that identify the quality of the respective wireless channel 18 between the respective EA mobile devices 14 and the primary mobile device 14-7. Assume that one or more of the EA mobile devices 14-3-14-6 in the set provide the controller node 12A corresponding MD-MD channel indicators. The controller node 12A determines MD-CN channel indicators as discussed previously. The controller node 12A also determines the MD-CN channel indicator that identifies the quality of the wireless channel 18-4 between the primary mobile device 14-7 and the controller node 12A. The controller node 12A may also receive from other controller nodes 12, such as the controller node 12N, interference information that identifies interference seen by the controller node 12N during transmission of the EA mobile devices 14-3-14-6. Collectively, this information may be referred to as cluster determination information. The controller node 12A then provides the cluster determination information to the central controller node 24 via, for example, a backhaul network 16. As discussed above, while for purposes of brevity this process is discussed only for the primary mobile device 14-7, in practice, the controller node 12A may determine such information for multiple primary mobile devices 14 that have future scheduled transmissions, and include such information in the cluster determination information provided to the central controller node 24.

Similarly, the controller node 12N determines that the EA mobile devices 14-9-14-11 have unscheduled transmissions at the first time, and thus directs the set of EA mobile devices 14-9-14-11 to determine corresponding MD-MD channel indicators that identify the quality of the wireless channels 18-12, 18-13 and 18-16, respectively, between the EA mobile devices 14-9-14-11 and the primary mobile device 14-8. Assume that each of the EA mobile devices 14-9-14-11 determines that the corresponding MD-MD channel indicator complies with the threshold channel indicator, and provides the corresponding MD-MD channel indicator to the controller node 12N.

The controller node 12N then determines MD-CN channel indicators that identify the quality of the wireless channels 18-10, 18-14 and 18-15 between the EA mobile devices 14-9-14-11 and the controller node 12N. The controller node 12N also determines the MD-CN channel indicator that identifies the quality of the wireless channel 18-11 between the primary mobile device 14-8 and the controller node 12N. The controller node 12N may also receive from other controller nodes 12, such as the controller node 12A, interference information that identifies interference seen by the controller node 12A during transmission by the EA mobile devices 14-9-14-11.

The controller node 12N then provides the cluster determination information to the central controller node 24 via the backhaul network 16. As discussed above, while for purposes of brevity this process is discussed only for the primary mobile device 14-8, in practice, the controller node 12N may determine such information for many primary mobile devices 14 that have future scheduled transmissions, and include such information in the cluster determination information provided to the central controller node 24.

Referring now to FIG. 13, the central controller node 24 receives the cluster determination information from each controller node 12 (FIG. 13, step 10000). The cluster determination information received from each controller node 12 identifies at least one primary mobile device 14 having a scheduled transmission, and at least one EA mobile device 14 that is unscheduled for transmission.

The central controller node 24 determines a desired system performance metric (FIG. 13, step 10002). The system performance metric may be a configuration option, may be predetermined, or may vary depending on a current state of the system 22. In one embodiment, the system performance metric is a highest throughput metric based on the average throughput of all clustered primary mobile devices 14, such that the sum of the rates between all primary mobile devices 14 divided by the number of primary mobile devices 14 is maximized. Such metric may be based on the following, or a similar, function:

$$\text{sum}(r_i)/N$$

where N is the number of primary mobile devices 14, and $r_i$ is a link rate (e.g., in bps/Hz) between the primary mobile device 14 and the serving controller node 12 that the primary mobile device 14 can achieve after clustering.

In another embodiment, the system performance metric is a fairness metric, based on a harmonic mean of throughput. Such metric may be based on the following, or a similar, function:

$$N/(\text{sum}(1/r_i))$$

where N is the number of primary mobile devices 14, and $r_i$ is a link rate (e.g., in bps/Hz) between the primary mobile device 14 and the serving controller node 12 that the primary mobile device 14 can achieve after clustering. Maximizing this metric may ensure fairness and quality of service in the system 22.

Based on the system performance metric, the central controller node 24 forms, or otherwise determines, cluster sets for the controller nodes 12A-12N (FIG. 13, step 10004). The central controller node 24 then provides the cluster information that identifies the cluster sets to the controller nodes 12A-12N.

It should be noted that the two disclosed clustering mechanisms, distributed or centralized, each have various benefits, as summarized in table 1, below.

TABLE 1

|  | Centralized (Exhaustive) | Distributed (Greedy) | |
|---|---|---|---|
|  |  | Interference limited | Not Interference limited |
| Convergence time | Relatively slow: scales exponentially | Relatively Fast: scales linearly | |
| Throughput improvement | Best possible | Less optimal | |
| Backhaul overhead | Central controller node 24 collects cluster determination info from controller nodes 12 | Measured interference info is exchanged between controller nodes 12 | None |
| Computation | Centralized | Distributed in controller nodes 12 | |

FIG. 14 is a block diagram of a controller node 12 suitable for implementing aspects of the embodiments disclosed herein. As discussed above, in the context of a LTE or LTE-A system, the controller node 12 may comprise eNodeB controllers. In the context of a Wi-Fi® system, the controller node 12 may comprise, for example, a WAP. The controller node 12 includes a communications interface 26 and a controller 28. The communications interface 26 generally includes analog and/or digital components for sending and receiving communications to and from mobile devices 14 within a wireless coverage area of the controller node 12, as well as sending and receiving communications to and from other controller nodes 12, either directly or via the network 16. Those skilled in the art will appreciate that the block diagram of the controller node 12 necessarily omits numerous features that are not necessary for a complete understanding of this disclosure.

Although all of the details of the controller 28 are not illustrated, the controller 28 comprises one or several general-purpose or special-purpose processors 30 or other microcontrollers programmed with suitable software programming instructions and/or firmware to carry out some or all of the functionality of the controller nodes 12 described herein. In addition, or alternatively, the controller 28 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the controller nodes 12 described herein. A memory 32, such as a random access memory (RAM), may be used by the processor 30 to store data and programming instructions which, when executed by the processor 30, implement all or part of the functionality described herein. The controller node 12 may also include one or more storage media (not illustrated) for storing data necessary and/or suitable for implementing the functionality described herein, as well as for storing the programming instructions which, when executed on the processor 30, implement all or part of the functionality described herein. One embodiment of the present disclosure may be implemented as a computer program product that is stored on a computer-readable storage medium, the computer program product including programming instructions that are configured to cause the processor 30 to carry out the steps described herein.

FIG. 15 is a block diagram of a central controller node 24 suitable for implementing aspects of the embodiments disclosed herein. In some embodiments, the central controller node 24 may be configured similarly to a controller node 12. Indeed, in some embodiments, the central controller node 24 may be one of the controller nodes 12. In such embodiments, as discussed above, in the context of a LTE or LTE-A system, the central controller node 24 may comprise an eNodeB controller, or, in the context of a Wi-Fi® system, the central controller node 24 may comprise, for example, a WAP.

The central controller node 24 includes a communications interface 34 and a controller 36. The communications interface 34 generally includes analog and/or digital components for sending and receiving communications to and from the controller nodes 12 either directly or via the network 16. The communications interface 34 may also include components for communicating with mobile devices 14 within a wireless coverage area of the central controller node 24. Those skilled in the art will appreciate that the block diagram of the central controller node 24 necessarily omits numerous features that are not necessary for a complete understanding of this disclosure.

Although all of the details of the controller 36 are not illustrated, the controller 36 comprises one or several general-purpose or special-purpose processors 38 or other microcontrollers programmed with suitable software programming instructions and/or firmware to carry out some or all of the functionality of the central controller node 24 described herein. In addition, or alternatively, the controller 36 may comprise various digital hardware blocks (e.g., one or more ASICs, one or more off-the-shelf digital or analog hardware components, or a combination thereof) (not illustrated) configured to carry out some or all of the functionality of the central controller node 24 described herein. A memory 40, such as RAM, may be used by the processor 38 to store data and programming instructions which, when executed by the processor 38, implement all or part of the functionality described herein. The central controller node 24 may also include one or more storage media (not illustrated) for storing data necessary and/or suitable for implementing the functionality described herein, as well as for storing the programming instructions which, when executed on the processor 38, implement all or part of the functionality described herein. One embodiment of the present disclosure may be implemented as a computer program product that is stored on a computer-readable storage medium, the computer program product including programming instructions that are configured to cause the processor 38 to carry out the steps described herein.

FIG. 16 is a block diagram of a mobile device 14 according to one embodiment. As discussed above, the mobile device 14 may comprise any device capable of wireless communications, including, for example, a smart phone; a portable computer such as a laptop or notebook computer; a computer tablet; a personal digital assistant (PDA), or the like. The mobile device 14 includes a communications interface 42 and a controller 44. The communications interface 42 generally includes analog and/or digital components for sending and receiving communications to and from other wireless devices, including, for example, the controller nodes 12. Those skilled in the art will appreciate that the block diagram of the mobile device 14 necessarily omits numerous features that are not necessary for a complete understanding of this disclosure.

Although all of the details of the controller 44 are not illustrated, the controller 44 comprises one or several general-purpose or special-purpose processors 46 or other microcontrollers programmed with suitable software programming instructions and/or firmware to carry out some or all of the functionality of the mobile device 14 described herein. In addition, or alternatively, the controller 44 may comprise various digital hardware blocks (e.g., one or more ASICs, one or more off-the-shelf digital or analog hardware components, or a combination thereof) (not illustrated) configured to carry out some or all of the functionality of the mobile device 14 described herein. A memory 48, such as RAM, may be used by the processor 46 to store data and programming instructions which, when executed by the processor 46, implement all or part of the functionality described herein. The mobile device 14 may also include one or more storage media (not illustrated) for storing data necessary and/or suitable for implementing the functionality described herein, as well as for storing the programming instructions which, when executed on the processor 46, implement all or part of the functionality described herein. One embodiment of the present disclosure may be implemented as a computer program product that is stored on a computer-readable storage medium, the computer program product including programming instructions that are configured to cause the processor 46 to carry out the steps described herein.

Among other advantages, the disclosed embodiments improve individual and aggregate throughput in wireless systems in part by exploiting idle mobile devices for retransmission of signals from active mobile devices. In addition to improving system capacity and throughput, the embodiments may also aid in eliminating coverage holes for mobile devices in poor coverage areas. From a controller node processing load perspective, the embodiments may also reduce and potentially eliminate additional processing requirements related to uplink or downlink Coordinated Multipoint Transmission (CoMP). The clustering mechanisms disclosed herein achieve virtual multiple input multiple output (MIMO) gains that can be implemented in a distributed manner that minimizes computational load at controller nodes 12, as well as minimizes bandwidth requirements between controller nodes 12 to virtual MIMO gains similar to those in CoMP systems.

Those skilled in the art will recognize improvements and modifications to the preferred embodiments of the present disclosure. All such improvements and modifications are considered within the scope of the concepts disclosed herein and the claims that follow.

What is claimed is:

1. A method for determining a cluster set of mobile devices comprising:
    identifying, by a controller node, a primary mobile device that has a scheduled transmission for the controller node at a first time;
    identifying, by the controller node, a set of eligible assistant (EA) mobile devices from a plurality of mobile devices;
    directing each EA mobile device in the set to determine a corresponding mobile device-to-mobile (MD-MD) device channel indicator that identifies a quality of a channel between the each EA mobile device and the primary mobile device;
    receiving from at least one EA mobile device in the set the corresponding MD-MD channel indicator; and
    determining a cluster set that includes the primary mobile device and the at least one EA mobile device.

2. The method of claim 1, wherein each EA mobile device in the set is identified based on the each EA mobile device being unscheduled for transmission at the first time.

3. The method of claim 1, wherein identifying, by the controller node, the set of EA mobile devices from the plurality of mobile devices comprises receiving, from each EA mobile device in the set, an eligibility indicator that indicates the each EA mobile device is eligible to assist the primary mobile device.

4. The method of claim 1 further comprising:
    directing each EA mobile device in the cluster set to receive the scheduled transmission and to retransmit the scheduled transmission to the controller node.

5. The method of claim 4 further comprising:
    directing a receive beam in a direction toward the at least one EA mobile device;
    directing the at least one EA mobile device to retransmit the scheduled transmission using a lower power level than a power level previously used by the at least one EA mobile device.

6. The method of claim 4 further comprising:
    sending each EA mobile device in the cluster set a precoding matrix to apply to the retransmission of the scheduled transmission.

7. The method of claim 1 further comprising:
    receiving the scheduled transmission from the primary mobile device; and
    receiving a retransmitted scheduled transmission from each EA mobile device in the cluster set.

8. The method of claim 7 further comprising:
    combining the scheduled transmission and the retransmitted scheduled transmissions received from each EA mobile device in the cluster set to generate a combined scheduled transmission; and
    processing the combined scheduled transmission.

9. The method of claim 1 further comprising:
    based at least in part on the determination of the cluster set, sending the primary mobile device a new modulation and coding scheme (MCS) having a higher data rate for use in a subsequent transmission than a previous MCS used by the primary mobile device in an immediately previous transmission.

10. The method of claim 1 wherein receiving from the at least one of the EA mobile devices the corresponding MD-MD channel indicator comprises receiving from a plurality of EA mobile devices in the set a corresponding MD-MD channel indicator, and wherein determining the cluster set comprises:
    sorting the plurality of EA mobile devices based at least in part on the corresponding MD-MD channel indicators to generate a sorted list of the EA mobile devices; and
    determining the cluster set to include a subset of the EA mobile devices from the plurality of EA mobile devices based at least in part on the sorted list.

11. The method of claim 10 further comprising:
    determining, for each EA mobile device in the plurality of EA mobile devices, a corresponding mobile device-to-controller node (MD-CN) channel indicator that identifies a quality of a channel between the each EA mobile device and the controller node; and
    wherein sorting the plurality of EA mobile devices based at least in part on the MD-MD channel indicator to generate the sorted list of the EA mobile devices comprises:
        sorting the plurality of EA mobile devices based at least in part on the corresponding MD-MD channel indicators and the corresponding MD-CN channel indicators to generate the sorted list of the EA mobile devices.

12. The method of claim 10 further comprising:
    receiving, by the controller node, interference information from a neighboring controller node that identifies an interference level associated with one or more of the EA mobile devices, and wherein sorting the plurality of EA mobile devices based at least in part on the MD-MD channel indicators to generate the sorted list of the EA mobile devices comprises:
sorting the plurality of EA mobile devices based at least in part on the corresponding MD-MD channel indicators and the interference information to generate the sorted list of the EA mobile devices.

13. The method of claim 1 wherein receiving from the at least one of the EA mobile devices the corresponding MD-MD channel indicator comprises receiving from a plurality of the EA mobile devices in the set a corresponding MD-MD channel indicator, and further comprising:
determining, for each EA mobile device in the plurality of EA mobile devices, a corresponding mobile device-to-controller node (MD-CN) channel indicator that identifies a quality of a channel between the each EA mobile device and the controller node; and wherein determining the cluster set comprises:
sorting the plurality of EA mobile devices based at least in part on the corresponding MD-CN channel indicators to generate the sorted list of the EA mobile devices; and
determining the cluster set to include a subset of the EA mobile devices from the plurality of EA mobile devices based at least in part on the sorted list.

14. The method of claim 1, wherein determining the cluster set that includes the primary mobile device and the at least one EA mobile device comprises:
sending, to a central controller node, the corresponding MD-MD channel indicator, an identification of the at least one EA mobile device, and an identification of the primary mobile device; and
receiving, from the central controller node, the cluster set.

15. A method for providing a channel indicator to a controller node comprising:
receiving, by an eligible assistant (EA) mobile device from a controller node, a request to determine a mobile device-to-mobile device (MD-MD) channel indicator that identifies a quality of a channel between the EA mobile device and a primary mobile device;
in response to the request, listening to a transmission from the primary mobile device;
determining the MD-MD channel indicator based on the transmission; and
sending the MD-MD channel indicator to the controller node.

16. The method of claim 15 further comprising:
receiving, from the controller node, a request to retransmit a scheduled transmission from the primary mobile device to the controller node.

17. The method of claim 16 further comprising:
receiving, from the primary mobile device the scheduled transmission; and
transmitting the scheduled transmission to the controller node.

18. The method of claim 15 further comprising:
determining that a link rate between the EA mobile device and the primary mobile device complies with a threshold channel indicator; and
based on the determination, determining the MD-MD channel indicator based on the transmission, and sending the MD-MD channel indicator to the controller node.

19. The method of claim 18, wherein the threshold channel indicator is based on a link rate between the primary mobile device and the controller node.

20. A method for determining a cluster set of mobile devices, comprising:
receiving, from each controller node of a plurality of controller nodes, cluster determination information that identifies at least one primary mobile device that has a scheduled transmission for the each controller node at a scheduled time, and at least one eligible assistant (EA) mobile device that is unscheduled for transmission at the scheduled time;
determining a system performance metric;
forming cluster sets based on the system performance metric, each cluster set identifying a primary mobile device and at least one EA mobile device; and
sending cluster information to the plurality of controller nodes that identifies the cluster sets.

21. The method of claim 20, wherein the system performance metric comprises an average throughput of the identified at least one primary mobile devices.

22. The method of claim 20, wherein the system performance metric comprises a harmonic mean of the identified at least one primary mobile devices.

23. The method of claim 20, wherein the cluster determination information comprises mobile device-to-controller node channel indicators identifying a quality of a channel between the each controller node and the at least one EA mobile device and mobile device-to-mobile device channel indicators identifying a quality of a channel between the at least one EA mobile device and the at least one primary mobile device.

24. A controller node comprising:
a communications interface configured to communicate with a plurality of mobile devices; and
a controller comprising a processor and coupled to the communications interface, the controller configured to:
identify a primary mobile device that has a scheduled transmission for the controller node at a first time;
identify, from a plurality of mobile devices, a set of eligible assistant (EA) mobile devices from a plurality of mobile devices;
direct each EA mobile device in the set to determine a corresponding mobile device-to-mobile device channel indicator that identifies a quality of a channel between the each EA mobile device and the primary mobile device;
receive from at least one EA mobile device in the set the corresponding mobile device-to-mobile device channel indicator; and
determine a cluster set that includes the primary mobile device and the at least one EA mobile device.

25. An eligible assistant mobile device comprising:
a communications interface configured to communicate with a controller node; and
a controller comprising a processor and coupled to the communications interface, the controller configured to:
receive, from the controller node, a request to determine a mobile device-to-mobile device (MD-MD) channel indicator that identifies a quality of a channel between the EA mobile device and a primary mobile device;
in response to the request, listen to a transmission from the primary mobile device;
determine the MD-MD channel indicator based on the transmission; and
send the MD-MD channel indicator to the controller node.

26. The controller node of claim 24, wherein each EA mobile device in the set is identified based on the each EA mobile device being unscheduled for transmission at the first time.

27. The controller node of claim 24, wherein to identify, by the controller node, the set of EA mobile devices from the plurality of mobile devices the controller is further configured to receive, from each EA mobile device in the set, an eligibility indicator that indicates the each EA mobile device is eligible to assist the primary mobile device.

28. The controller node of claim 24, wherein the controller is further configured to direct each EA mobile device in the cluster set to receive the scheduled transmission and to retransmit the scheduled transmission to the controller node.

29. The controller node of claim 28, wherein the controller is further configured to send each EA mobile device in the cluster set a precoding matrix to apply to the retransmission of the scheduled transmission.

30. The controller node of claim 28, wherein the controller is further configured to:
 receive the scheduled transmission from the primary mobile device; and
 receive a retransmitted scheduled transmission from each EA mobile device in the cluster set.

31. The eligible assistant (EA) mobile device of claim 25, wherein the controller is further configured to receive, from the controller node, a request to retransmit a scheduled transmission from the primary mobile device to the controller node.

32. The EA mobile device of claim 31, wherein the controller is further configured to:
 receive, from the primary mobile device, the scheduled transmission; and
 transmit the scheduled transmission to the controller node.

33. The EA mobile device of claim 25, wherein the controller is further configured to:
 determine that a link rate between the EA mobile device and the primary mobile device complies with a threshold channel indicator; and
 based on the determination, determine the MD-MD channel indicator based on the transmission, and send the MD-MD channel indicator to the controller node.

34. The EA mobile device of claim 33, wherein the threshold channel indicator is based on a link rate between the primary mobile device and the controller node.

35. The EA mobile device of claim 25, wherein the controller is further configured to receive, from the controller node, information that indicates that the primary mobile device is scheduled to make a scheduled transmission.

36. The EA mobile device of claim 25, wherein the controller is further configured to receive, from the controller node, a modulating and coding scheme (MCS) index provided to the primary mobile device.

37. The EA mobile device of claim 36, wherein the controller is further configured to decode, by the EA mobile device, a scheduled transmission from the primary mobile device using the MCS index.

38. The EA mobile device of claim 25, wherein the controller is further configured to receive, from the controller node, cluster information that indicates that the EA mobile device is part of a cluster set of mobile devices.

39. The EA mobile device of claim 38, wherein the controller is further configured to receive, from the controller node, information directing the EA mobile device to retransmit a scheduled transmission at a lower power level than a power level previously used by the EA mobile device.

* * * * *